United States Patent [19]
Breaux et al.

[11] Patent Number: 5,259,705
[45] Date of Patent: Nov. 9, 1993

[54] GUIDE BOX ASSEMBLY SYSTEM FOR IN-GROUND BARRIER INSTALLATION

[76] Inventors: Louis B. Breaux, 2521 Fawn Wood Rd., Marrero, La. 70072; Lloyd F. Moffett, Sr., 1741 Beth Dr., Slidell, La. 70458

[21] Appl. No.: 985,944

[22] Filed: Dec. 4, 1992

Related U.S. Application Data

[63] Continuation-in-part of Ser. No. 831,555, Feb. 5, 1992, which is a continuation of Ser. No. 398,613, Aug. 25, 1989, Pat. No. 5,106,233.

[51] Int. Cl.⁵ .............................................. E02D 5/02
[52] U.S. Cl. .................................. 405/267; 405/128; 405/274
[58] Field of Search ............... 405/267, 266, 274–281, 405/128, 129, 258, 269, 282, 283

[56] References Cited

U.S. PATENT DOCUMENTS

| | | | |
|---|---|---|---|
| 785,274 | 3/1905 | Schleussner . | |
| 1,007,718 | 11/1911 | McGill . | |
| 1,713,675 | 5/1929 | Parish . | |
| 1,937,758 | 12/1933 | Harris . | |
| 2,101,285 | 12/1937 | Stevens . | |
| 2,232,845 | 2/1941 | Fieroh . | |
| 2,355,102 | 8/1944 | Odman . | |
| 2,937,065 | 5/1960 | Harza . | |
| 2,961,731 | 11/1960 | Buzzell et al. . | |
| 3,302,412 | 2/1967 | Hunsucker . | |
| 3,326,003 | 6/1967 | Marconi . | |
| 3,411,305 | 11/1968 | Cella . | |
| 3,479,827 | 11/1969 | Morrice . | |
| 3,593,528 | 7/1971 | Pavese . | |
| 3,848,855 | 11/1974 | Weiland | 256/73 |
| 3,864,921 | 2/1975 | Marx et al. . | |
| 3,886,705 | 6/1975 | Cornland | 52/586 |
| 4,059,964 | 11/1977 | Pavese . | |
| 4,090,365 | 5/1978 | Nieber . | |
| 4,145,891 | 3/1979 | Krings | 405/282 |
| 4,194,855 | 3/1980 | Egger | 405/128 |
| 4,259,028 | 3/1981 | Cook | 405/282 |
| 4,407,612 | 10/1983 | van Weele | 405/285 |
| 4,453,861 | 6/1984 | Bretz et al. | 405/267 |
| 4,484,835 | 11/1984 | van Klinken | 405/52 |
| 4,519,729 | 5/1985 | Clarke, Jr. et al. | 405/258 |
| 4,537,536 | 8/1985 | Tsubonuma et al. | 405/267 |
| 4,607,981 | 8/1986 | van Klinken | 405/52 |
| 4,657,442 | 4/1987 | Krings | 405/282 |

(List continued on next page.)

*Primary Examiner*—Dennis L. Taylor
*Attorney, Agent, or Firm*—C. Emmett Pugh

[57] ABSTRACT

A hazardous waste containment system for preventing the lateral migration of hazardous fluid substances (including both liquid and gas wastes) into the water table, particularly for sites which are located over a fluid impermeable strata of clay (20) or the like. The system uses an encircling (FIG. 8) barrier containment wall (W) comprising a plurality of slidingly engaged, interlocked, vertical barrier members (501/101) which extend down to and sealingly interface with the underlying fluid impermeable strata (20). The barrier members are slidingly engaged via interlocking male and female appendages, which mate and form vertically extended, interlocking, sealed joints, in which fluid impermeable seals (508/108) are formed. An installation method for assembling the barrier members in the ground uses a series of guide box assemblies (1-3+), which can be easily assembled and disassembled and which are placed in the excavation fully assembled with its exterior walls spaced from the side walls of the excavation, using their interiors to create a "clean," dirt-free, temporary, isolated work space for the insertion and interconnection of the barrier members. The method further includes the utilization of a sealant (25) at the base of the containment wall to prevent leaching under it (FIG. 9). The system may be used to contain a variety of materials and may be implemented in various soil conditions with similarly successful results. Two exemplary guide box assembly embodiments (FIGS. 1 & 10-13), the latter of which includes a pair of end, winged, base spreader bars (174/175), and two exemplary barrier member embodiments (FIGS. 5 & 10), double-wall and single wall, respectively, are disclosed.

23 Claims, 10 Drawing Sheets

U.S. PATENT DOCUMENTS

| | | | |
|---|---|---|---|
| 4,659,260 | 4/1987 | Morelli | 405/283 |
| 4,664,560 | 5/1987 | Cortlever | 405/258 |
| 4,671,705 | 6/1987 | Nussbaumer et al. | 405/267 |
| 4,673,316 | 6/1987 | Nussbaumer et al. | 405/267 |
| 4,679,965 | 7/1987 | Glaser et al. | 405/258 |
| 4,690,588 | 9/1987 | Berger | 405/274 X |
| 4,697,953 | 10/1987 | Nussbaumer et al. | 405/128 |
| 4,741,644 | 5/1988 | Cavalli et al. | 405/50 |
| 4,753,551 | 6/1988 | Brueggemann et al. | 405/128 |
| 4,797,158 | 1/1989 | Harriett | 106/74 |
| 4,808,039 | 2/1989 | Fischer | 405/281 |
| 4,909,674 | 3/1990 | Konno et al. | 405/267 |
| 4,917,543 | 4/1990 | Cole et al. | 405/262 |
| 4,927,297 | 5/1990 | Simpson | 405/270 |
| 4,929,126 | 5/1990 | Steenbergen et al. | 405/267 |
| 4,981,394 | 1/1991 | McLaren et al. | 405/129 |
| 4,990,210 | 2/1991 | Glaser et al. | 405/267 X |
| 4,993,880 | 2/1991 | Collins | 405/283 |
| 5,013,185 | 5/1991 | Taki | 405/128 |
| 5,096,334 | 3/1992 | Plank | 405/283 |
| 5,106,233 | 4/1992 | Breaux | 405/267 X |
| 5,163,785 | 11/1992 | Zanelli et al. | 405/274 X |

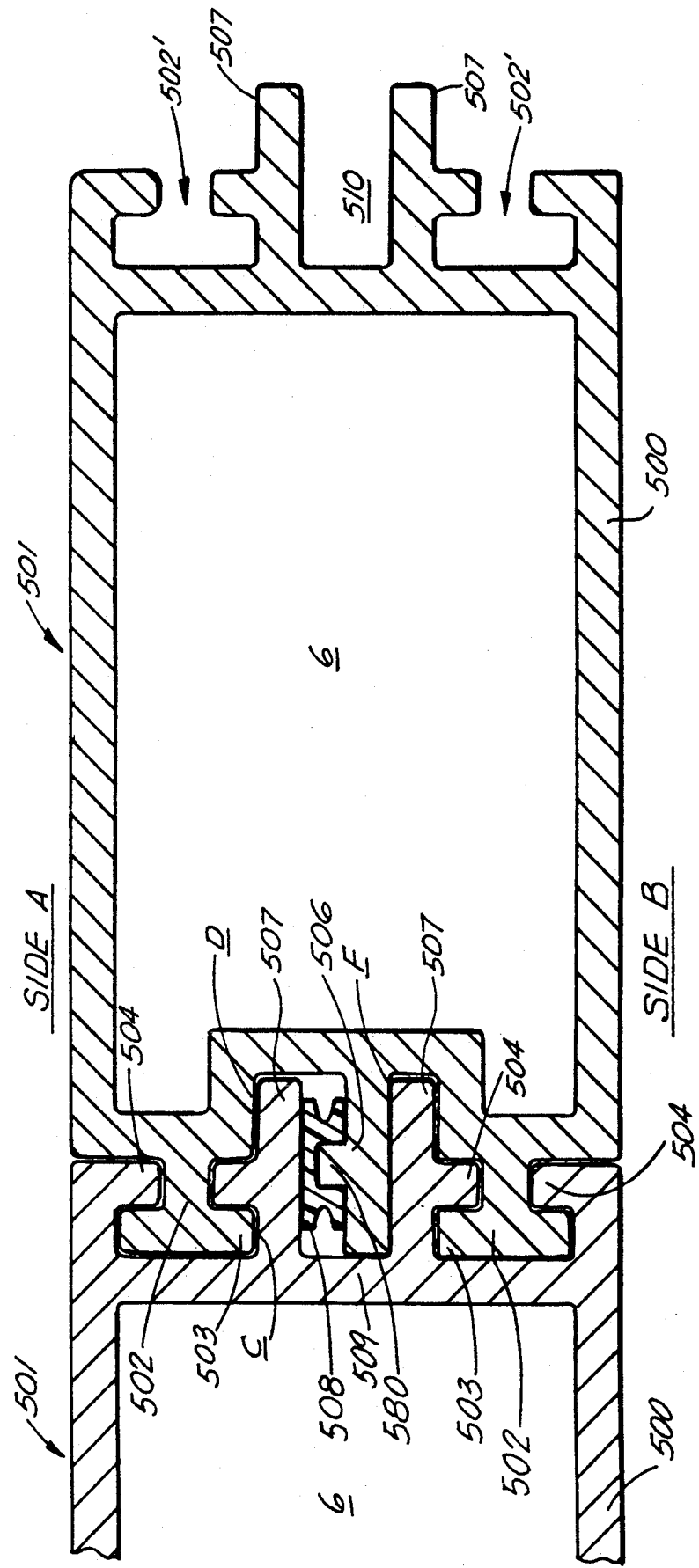

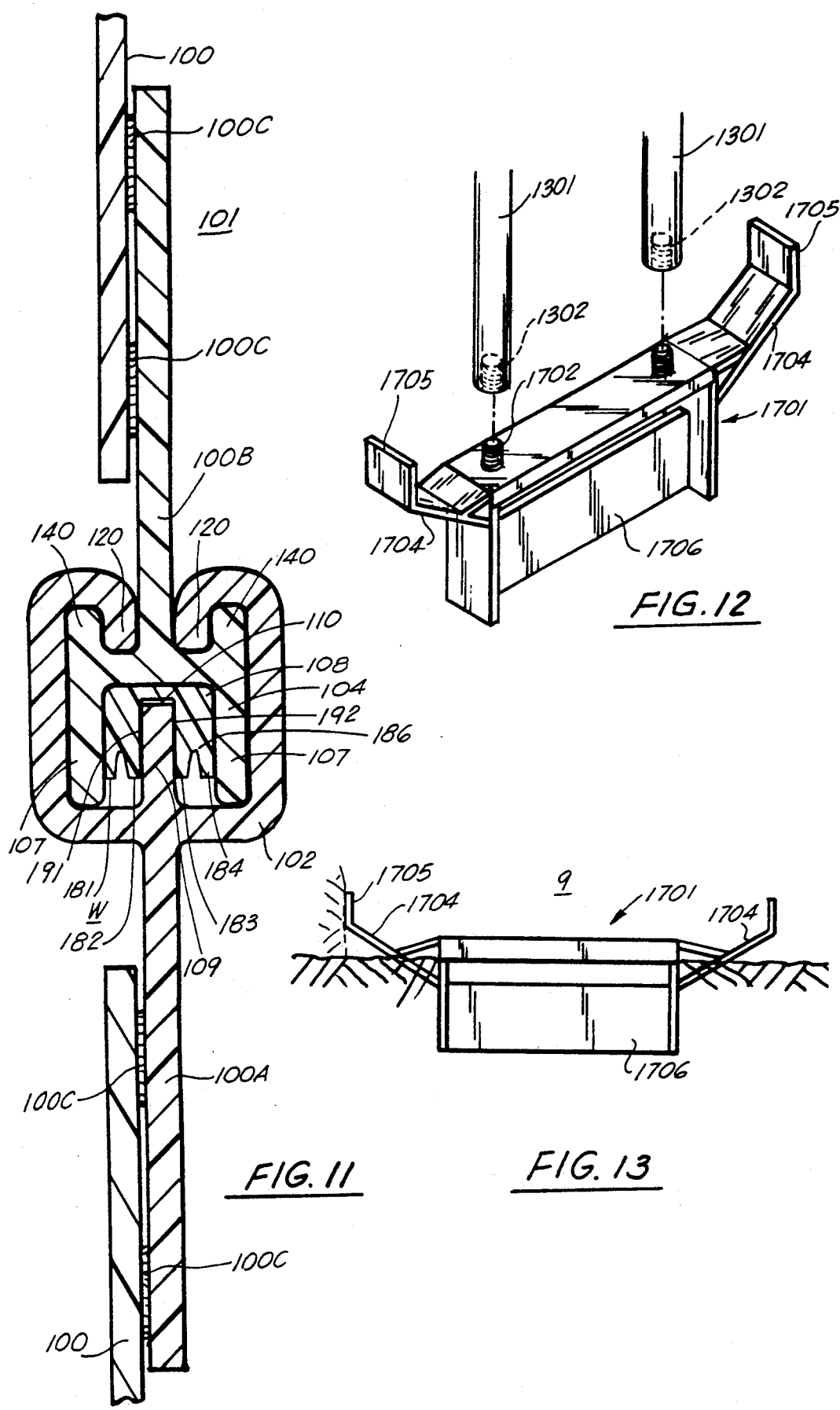

ns. The tolerance given in the scraping dimensions does not allow for any "wiggle room" in sliding the pans together in the '412 patent, and even if such room is added by loosening the tolerance, a fluid impermeable seal at the interlock is impossible to attain.

GUIDE BOX ASSEMBLY SYSTEM FOR IN-GROUND BARRIER INSTALLATION

REFERENCE TO RELATED APPLICATIONS

This application is a continuation-in-part of pending patent application Ser. No. 07/831,555 filed Feb. 5, 1992, entitled "Hazardous Waste Containment System", which application in turn is a continuation of patent application Ser. No. 398,613, filed Aug. 25, 1989 and issued as U.S. Pat. No. 5,106,233 on Apr. 21, 1992, the disclosures of which applications are incorporated herein by reference.

Applicant Breaux in connection with another co-inventor (Leonard F. Sansone) is concurrently filing an application entitles "In-Ground Barrier Member Interlocking Joint and Seal System," the disclosure of which is likewise incorporated herein by reference.

TECHNICAL FIELD

The present invention relates principally to hazardous waste containment systems and more particularly to a method for preventing, for example, the migration and leaching of hazardous fluid substances into the water table, including gases such as methane gas, using a containment wall, including a guide box assembly system for installing the wall components.

The present invention teaches the use of an in-ground containment wall comprising a plurality of slidingly engaged, interlocked, vertical barrier members installed in the ground. The barrier members are engaged by means of, preferably, interlocking connectors, which include therein a means for forming a fluid impermeable seal.

The preferred method for implementing the invention includes the preparation by trenching, auguring or digging, etc., of vertical openings or excavations of prescribed depth, width, and/or diameter in the soil surrounding the area to be contained down preferably to an underlying, impermeable strata; installation of the interconnected, sealed, vertical barrier members to produce the in-ground, sealed, containment wall therein using a series of guide box assemblies preferably spaced from the side walls of the excavation and having two, spaced wall panels forming an isolated work space for the barrier members between them; at least partially filling any open cores of the barrier members and at least partially back-filling the opening between the interior sides of the wall panels themselves and between the outer sides of the wall panels and the sides of the openings or excavations; and ultimately removing the wall panels of the guide box assemblies, leaving, for example, a series of bottom, anchoring, spreader base plates in the bottom of the openings or excavations into the impermeable strata and underneath the bottoms of the barrier members.

The present invention may be used to restrain the lateral migration of a variety of materials, both liquid and gas, and may be implemented in various soil conditions with similarly successful results.

The system of the present invention provides an efficient and cost effective containment system, as will be shown infra.

As noted above, the method of installing the present system includes the utilization of a guide box template/anti-caving assembly system for properly aligning the barrier members and providing an open, isolated, work space, particularly where soil conditions are such that there is a likelihood for cave-in.

BACKGROUND ART

As may be determined by a review of the below cited patents, the prior art has failed to contemplate a system as taught in the present invention. Further, the patents cited below are fully distinguishable in construction and use, and are cited only as being at best remotely pertinent to the claimed invention.

A list of prior patents which may be of interest is presented below:

| U.S. Pat. No. | Patentee(s) | Issue Date |
| --- | --- | --- |
| 2,101,285 | Stevens | 12/07/1937 |
| 2,937,065 | L. Harza | 05/17/1960 |
| 2,961,731 | Buzzell et al | 11/29/1960 |
| 3,202,412 | Hunsucker | 02/07/1967 |
| 3,411,305 | A. Cella | 11/19/1968 |
| 3,848,855 | Weiland | 11/19/1974 |
| 3,886,705 | Cornland | 06/03/1975 |
| 4,808,039 | Fischer | 02/28/1989 |

A cursory review of the above cited patents shows that the prior art is indeed clearly distinguishable from and does not make "obvious" the present invention. Indeed most, if not all, of the cited patents are not part of the prior art of the invention but rather are from disparate, non-analogous arts.

U.S. Pat. No. 2,101,285 teaches a "tubular interlocking piling" of steel having interlocking structures incorporated therewith. The specification teaches the system as being used in the construction or reinforcement of coffer dams, bridge piers and the like. It is noted that the apparatus does not contemplate the utilization of a containment structure, although it does teach implementation as a support wall for above ground construction. Further, unlike the present invention, sealing means for preventing fluid migration is not taught.

U.S. Pat. No. 3,302,412 to Hunsucker teaches "interlocking sheet piles and method of installation", including means to slidingly engage and seal the sheet piles. This system is likewise obviously distinguishable from the present invention, for a variety of reasons. The '412 patent is directed to sheet pilings for forming earthen walls or cofferdams, and is not directed to containment systems, as discussed in the present invention. Further, implementation of the system is impractical, very costly and would be highly unsuitable for use in the types of soil conditions anticipated by the system of the present invention.

For example, the scraper 24 (FIG. 3) is inadequate to remove debris from the cavity 16 while the sheet pile is being driven into the soil. The "scraped" debris would not have anywhere to go, as the tolerance of the shoe and cavity connection is too little to be expected therethrough and the debris could not be pushed through the bottom of the cavity as it is already firmly embedded in packed soil.

While the tolerance of the engagement system is too small to allow scraping of debris therethrough, it is of sufficient tolerance that it allows liberal leakage of a fluid sealant, to the point that it would be impossible to accurately project a fluid impermeable seal on a consistently monitorable basis.

The lugs 30 (FIG. 2) as taught in the '412 patent render the system unworkable in terms of taking away the tolerance necessary for slidingly engaging the panels. The tolerance or gap between the shoe and cavity is needed to allow a smooth installation. Lastly, the construction is overly costly and highly impractical, with the necessity of multiple apertures to be fabricated therein, the alignment of apertures to both cavities, the removal and replacement of the feed tube at each driven pile, and the implementation of scrapers as taught in the specification in the field would be very difficult and time consuming. Thus, even if the system works as taught, it would be usable only with extreme cost and complexity of fabrication.

U.S. Pat. No. 3,886,705 to Cornland teaches a "Hollow Structural Panel of Extruded Plastics Material and a Composite Panel Structure Formed Thereof". The patent teaches a hollow structural panel configured to form partition walls or the like and is designed for resisting deformation due to load bearing. While the '705 patent does teach the utilization of a rubber gasket for preventing leakage of snow, rain, or the like, this apparatus is unsuitable for utilization in conjunction with the system of the present invention. Apparently, the system of the '705 patent would require complete fabrication above ground prior to installation, which would make the system unsuitable for use with the preferred method of the present invention.

U.S. Pat. No. 3,411,305 issued in 1968 to Cella teaches a "Tubular Interlocking Piling for Wall Assemblies". A variation of sheet piling technology, this patent contemplates a system of interlocking piling components in the construction of "cofferdams, walls, dams, piers, abutments, and other types of walls where strong construction is necessary."

The '305 disclosure discloses a "tubular pile unit" of a sufficiently strong material for forming a substantial load bearing wall; it is noted that the does not teach in any manner a fluid impermeable unit. Consequently, this apparatus is likewise unsuitable for the preferred system contemplated in the present invention. Further, it is noted that load bearing is not a factor in the present invention, for which factor the '305 patent is primarily designed.

U.S. Pat. Nos. 2,937,065 and 2,961,731 disclose fluid impermeable gasket systems fully distinguishable in use, method and apparatus from the present invention.

Not found during the patent search, but known to applicants, is an apparently unpatented method for containing hazardous waste. This present method of preventing the leaching of contaminated fluids from hazardous waste sites comprises the implementation of a "slurry" wall around the site. A trench is dug to a sufficient depth to contact a fluid impermeable natural earth strata, such as clay.

A problem with preparing such a trench, however, relates to the soils' cohesive strength and its propensity for "caving." This system therefore often has had to resort to expensive sheet pilings to retain and strengthen the trench walls. As the sheet pilings typically were insufficient to prevent seepage of the containment therethrough, a still more expensive medium, typically bentonite, a naturally occurring clay, was used to fill the trench. This slurry would solidify, forming a fluid impermeable subterranean "dam" for containment.

The present invention is anticipated to cost substantially less than the most cost efficient slurry wall system, as it does not require sheet pilings or any other means of preventing "caving" because the present invention provides a series of guide box assemblies that create a temporary, isolated work space for the insertion and joining of the barrier members.

Other material costs of the present system are likewise significantly less, requiring as little as one-one-hundredth (1/100) of the amount of bentonite. It is noted that the bentonite costs fluctuate, but may run as high as two hundred ($200.00) dollars per ton including freight (freight on board) job site.

Likewise, the present invention does not require the utilization of piling equipment, heavy lift equipment, or extensive labor, as is necessary for implementation of the above system. Instead, no piling equipment, and only relatively available lifters and less extensive labor is needed.

Some additional patents are listed below:

| U.S. Pat. No. | Patentee(s) | Issue Date |
|---|---|---|
| 1,007,718 | J. I. McGill | 11/07/11 |
| 1,713,675 | R. L. Parish | 05/21/29 |
| 1,937,758 | F. R. Harris | 12/05/33 |
| 2,355,102 | O. R. Odman | 08/08/44 |
| 3,302,412 | W. A. Hunsucker | 02/07/67 |
| 3,479,827 | A. R. S. Morrice | 11/25/69 |
| 3,593,528 | J. R. Pavese | 07/20/71 |
| 3,864,921 | Marx et al | 02/11/75 |
| 4,059,964 | Pavese | 11/29/77 |
| 4,090,365 | Nieber | 05/23/78 |
| 4,145,891 | Krings | 03/27/79 |
| 4,194,855 | Egger | 03/25/80 |
| 4,259,028 | Cook | 03/31/81 |
| 4,407,612 | van Weele | 10/04/83 |
| 4,453,861 | Bretz et al | 06/12/84 |
| 4,484,835 | van Klinken | 11/27/84 |
| 4,519,729 | Clarke, Jr. et al | 05/28/85 |
| 4,537,536 | Tsubonuma et al | 08/27/85 |
| 4,607,981 | van Klinken | 08/26/86 |
| 4,657,442 | Krings | 04/14/87 |
| 4,659,260 | Morelli | 04/21/87 |
| 4,664,560 | Cortlever | 05/12/87 |
| 4,671,705 | Nussbaumer et al | 06/09/87 |
| 4,673,316 | Nussbaumer et al | 06/16/87 |
| 4,679,965 | Gläser et al | 07/14/87 |
| 4,697,953 | Nussbaumer et al | 10/06/87 |
| 4,741,644 | Cavelli et al | 05/03/88 |
| 4,753,551 | Brueggemann et al | 06/28/88 |
| 4,797,158 | Harriett | 01/10/89 |
| 4,808,039 | Fischer | 02/28/89 |
| 4,909,674 | Konno et al | 03/20/90 |
| 4,917,543 | Cole et al | 04/17/90 |
| 4,927,297 | Simpson | 05/22/90 |
| 4,929,126 | Steenbergen et al | 05/29/90 |
| 4,981,394 | McLaren et al | 01/01/91 |
| 4,993,880 | Collins | 02/19/91 |
| 5,013,185 | Taki | 05/07/91 |
| 5,096,334 | Plank | 03/27/92 |

The '718, '675, '758, '412, '039, '543 and '394 patents are considered to be more pertinent to the sealing aspects of the invention; the '827, '528, '921, '964, '365, '891, '028, '442, '260 and '334 patents are directed to various types of "trench boxes;" the '855, '612, '835, '861, '729, '536, '981, '705, '316, '965, '953, '644, '551, '158, '039, '297, '126, '880 and '185 patents are considered to be more pertinent to the over-all system of the invention; while the '102, '412 and '126 patents are considered to be more pertinent to various profiles used in various types of male/female joints used in a number of different items, some non-analogous to the present invention and all of which are significantly different from those used in the present invention, particularly those used in the interconnecting joints between the barrier members of the present invention.

With regard to "trench boxes", the prior art has contemplated numerous configurations for trench wall shoring devices and the like for preventing excavation cave-in, as evidenced by the sampling of patents noted above.

For example, U.S. Pat. No. 4,659,260 issued in 1987 for a "Trench Box" discloses a system to prevent the caving in of an excavated area, providing a reinforced shoring system. However, the guide box assembly of the present invention, which contemplates a slotted mechanism specifically configured for installing the barrier containment members of the present invention, teaches a mechanical installation system fully distinguishable from the '260 patent.

U.S. Pat. No. 4,090,364 to Nieber discloses a "Portal Frame for Trench Box Stack" wherein there is provided an easily assembled and disassembled system, but which nonetheless does not teach nor contemplate the mechanical aspects or template system or methodology of the present invention.

U.S. Pat. No. 4,059,964 issued in 1977 discloses an opposed, support wall system for the installation of trench wall sheeting in side open areas in the wall system, which are positioned against the side walls of the excavation in which the trench wall sheeting is being installed. This system, while pertinent, is nonetheless fully distinguishable from the present system, as it does not teach nor contemplate the mechanical interrelationship or methodology of the present invention.

The other patents noted are likewise distinguishable from the present invention but are included to illustrate the state of the art. In summation, the guide box assembly system of the present invention does have substantial novelty with regard to the known trench box art above, especially with regard to the mechanical aspects of the invention as utilized in the installation of the barrier member containment system of the invention.

Most of the patents noted as being pertinent to the over-all system of the invention teach or contemplate a system for containing or preventing the lateral migration of fluids through the soil via fluid impermeable fabric or plastic sheeting subterranean structures or the like.

These patents typically rely upon a bentonite slurry or similar liquid means of preventing the caving in of the excavated area, and are thereby much more expensive to install when compared to the present invention. Further, these systems are distinguishable in their interlocking means for the various barrier members, which include systems which do not even contemplate a sealed connection along the various joined members, substantially reducing, if not eliminating, any reliable containment of toxic fluid wastes.

U.S. Pat. No. 4,679,965 to Gläser et al entitled a "Method and Apparatus for Installing Panels into Recesses in the Ground" discloses a containment system wherein a trench is excavated and filled with the slurry, and large high density polyethylene (HDPE) sheets are engaged through slotted arrangements in the trench to form a barrier. This system is distinguishable from the present system, as it utilizes a different profile, no seal, and no guide box assembly in the installation.

The noted patents further include unusual devices for excavating areas for the installation of containment systems, such as, for example, U.S. Pat. No. 5,013,185, issued in 1985 to Osamu Taki for a "Multi-Shaft Auger Apparatus and Process for Fixation of Soils Containing Toxic Wastes", as well as other similar excavation systems. For another multi-auger apparatus, note U.S. Pat. No. 4,537,536 to Tsubonuma et al for a "Process and Apparatus of Constructing a Water Tight Underground Pile Wall".

For a solid barrier containment system, see U.S. Pat. No. 4,407,612 to van Weele, which discloses a partially load bearing wall comprised of curved concrete shell members, connected via spreader joints. This patent is readily distinguishable from the present invention, as it teaches a totally different structure, operation, and installation from the present invention.

U.S. Pat. No. 4,453,861 to Bretz et al teaches an in situ system for pouring concrete to form barrier containment walls and is likewise readily distinguishable from the present invention.

With regard to the noted seal and the male/female profile patents, there is included various sealing means for panel members and other pertinent systems. For example, Cortlever U.S. Pat. No. 4,664,560 issued in 1987 teaches a subterranean containment system wherein there is provided (note FIG. 3) a heat activated seal for preventing the lateral migration of liquid therethrough. The system as taught is clearly distinguishable from a patentability standpoint.

U.S. Pat. No. 4,917,543 issued in 1990 teaches a "Wall System Employing Extruded Panel Sections" wherein there is taught a connector element (25) which may also act to seal the various installed panels. Again, however, this system is distinguishable from the present invention.

U.S. Pat. No. 3,302,412 issued in 1967 discloses a lug member 30 (note FIG. 2) configured to space the sheet piling into a proper interlocking installation. Also taught is the disposition of a sealant (36, FIG. 7) for preventing leakage of the system. Again, however, this is still just another profile and seal means which is clearly distinguishable from the present invention.

The Simpson '297 patent forms an impermeable barrier in an excavation made down to bedrock to contain waste materials in the ground, in which a sheet of impervious material, such as a fabric carrying a substantially dehydrated sodiumbentonite clay, is placed along the side walls of the excavation, and the rest of the excavation is then filled with concrete.

The van Klinken '835 & '981 patents are directed to waste containment systems in which "more or less flexible sheets or foils" are introduced into the soil by means of a "lance."

In the Nussbaumer et al '953 patent a fluid sealing material is introduced through pipes into the ground which thereafter solidifies, sealing the wastes in a dump. The Brueggemann et al patent likewise uses a piping system to provide "a sealing screen for waste dumps." The Nussbaumer et al '316 patent uses slotted wall connections which must be flushed out prior to using plastic foil sealing elements for sealing two adjacent barrier wall sections.

In the Cavalli '644 patent initially vertical coupling members are formed in spaced bore holes in the ground, with the space between them excavated, and then a sandwich of high density polyethylene sheets with an internal mesh is connected between the coupling members, forming an "environmental cut-off and drain." In the Clarke et al '729 patent a trench is made and a series of membrane fluid barriers are placed in it suspended between slotted end connectors.

The Konno et al '674 patent forms "an underground continuous water-impervious wall" by rolling out an impervious sheet of material into a trench and charging a hardening material against the opposite side surfaces of the impervious sheet and allowing the material to harden. In the Steenbergen et al patent a screen of flexible material is fed into a trench typically in a folded over fashion, with the top of the fold being held up by appropriate means in the unfilled trench.

The Cortlever '560 patent, referred to above in connection with seals, also discloses the use of dam wall sheets (1) of stainless steel or of a synthetic resin which are sequentially inserted into the ground using an enclosing, vibrating, injection guide (19) aided by earth loosening water jets (29), with one sheet being vertically engaged with the preceding dam sheet via male-/female edge joints which are slid together. After one dam sheet is inserted into the ground, the vibratory injection guide is withdrawn to then be used for the next dam sheet.

The presence of all of these diverse, attempted "solutions" of the past to the challenge of forming an impermeable barrier about a waste area to be contained and the prior existence for many years of the various means used in the present invention to successfully meet this challenge provide further objective indicia or evidence of the "unobviousness" and patentability of the invention.

GENERAL DISCUSSION OF INVENTION

The present invention overcomes the problems of the prior art by providing a barrier wall installation system which is reliable, relatively economical and less hazardous.

As may be noted from the above, the prior art has not provided a relatively inexpensive yet consistently impermeable, readily implemented containment system for preventing the leaching to toxic materials from dump sites and the like. However, such is achieved in the present invention, and the exemplary embodiments of the present system comprise the utilization of a plurality of barrier members, each barrier member having a tubular or double-wall body or, alternatively, a single wall structure, with edge appendages on the opposite or complementary ends of the barrier member, with the barrier members being installed and interconnected in a protected, open work space provided by a series of interconnected guide box assemblies. The barrier member appendages are of a "male" and "female" type, respectively, and are configured to slidingly engage and lockingly interconnect juxtaposed barrier members in a vertical fashion.

Further, the appendages are configured with each to include a fluid impermeable seal between the associated appendages of the interconnected barrier members.

It is noted that the appendages are not limited to a hundred and eighty (180°) degree separation and may be implemented in a variety of circumferentially located positions relative to one another. For example, a ninety (90°) degree separation would be used for a ninety degree "corner" barrier member, while a variety of other degree separations could be utilized to form, for example, a "kidney" configured containment area. Other degree separations may be utilized for forming still other geometric containment configurations. Thus, the containment system need not necessarily form a circle or rectangle, and may be configured to contain any desired layout. It is noted that the engagement appendages for all configuration barrier members are designed to mate with the opposite appendages of other members of this invention.

The present invention of providing a vertical wall as a containment barrier is possible as the wall is installed down to a depth to intersect with, for example, an underlying clay strata in the soil, a fluid impermeable strata found at varying depths. Thus, various sites require different depths of implementation utilizing differing member lengths. Normally it is not necessary to go deeper than forty (40') feet, and, thus, conventional excavation equipment may be used in the present system. It is noted that clay is not the only fluid impermeable strata, and the present system may be used in conjunction with other fluid impermeable strata as well, such as, for further example, bedrock, with satisfactory results.

Another step, when desirable, in the installation method of the present invention, is the implementation of a sealing media to embed the base of the containment wall to prevent leaching thereunder. The exemplary embodiment of this step utilizes, when desirable, the naturally occuring clay bentonite as taught in the slurry wall concept for the base sealant, but in far less amounts. The base sealant need be implemented only in an amount sufficient to embed the bottom intersection of the wall and the strata. This may be, for example, four (4") or more inches, and more typically tweleve or eighteen (12" or 18") inches. It is also noted that, in some situations, this step may not be necessary.

For installation of the present invention particularly in soil conditions having a likelihood of "caving", the present invention teaches the implementation of a "guide box" template or guide box assembly system, into which the barrier members are placed and interconnected, extending the full depth and ultimately the full length of the excavation. The "guide box" serves at least five purposes, namely: 1) it provides an outer support structure which prevents any caving walls of the excavation from entering the area where the members are to be installed, lessening the likelihood of complications during engagement of the barrier members; 2) it provides a template for easy engagement and proper alignment of the barrier members during installation; 3) it provides protection for previously installed members against damage from the auger (when an augured hole is desirable); 4) it can act as a guide for the auger, if auguring is used; and 5) it can allow for gradual and controlled back-filling by being slowly extracted from the excavation, if so desired. However, the first two purposes are the primary purposes of the guide box assemblies of the invention.

Each guide box assembly typically includes two, spaced wall panels providing the protected, open work space for the barrier member installation between them, which wall panels can be easily assembled into a rigid unit by means of a series of laterally extending, top and bottom spreader bars. The lower or bottom spreader bars, which preferably can also serve as anchors for the guide box assemblies and bases for the barrier members, are easily detached and left down in the ground when the wall panels are removed from the excavation. This is achieved by the use of a series of vertical, parallel, guide shafts extending through the full height of the wall panels, connected at their tops to the top of their respective wall panels and temporarily connected at their bottoms to the anchoring spreader bars by means of rotatable interconnections, which can be easily reversed to detach the bottom spreader bars from the wall panels.

The present system contemplates excavation of the ground soil via trenching or auguring, but expressly teaches that other methods of excavation may be utilized with satisfactory results.

It is therefore an object of the present invention to provide a system for containing hazardous wastes, which is efficient, utilitarian, and cost effective, and which provides reliable protection against the threat of migrating contamination of adjacent aquifers and soil.

It is a further object of the present invention to provide a system for containing hazardous wastes, which utilizes a plurality of slidingly engaged interlocking containment members which are installed in a protected, open work space provided by a series of interconnected guide box assemblies.

It is a still further object of the present invention to provide a system for containing hazardous wastes that is adaptable to a variety of dump site configurations.

It is another object of the present invention to provide a system for containing hazardous wastes which provides reliable containment for a period of time equal to or exceeding conventional methods.

It is another object of the present invention to provide a system for containing hazardous wastes until such time as it can be removed or neutralized as desired.

It is a further object of the present invention to provide a method of installing a hazardous waste containment system utilizing a plurality of vertical barrier members wherein the method includes the utilization of a "guide box" template or assembly which aids in the installation process.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is a perspective view of an initial set of two guide box assemblies (of the type shown in FIG. 1) being installed in the ground to start the in-place formation of the containment wall, with the second guide box assembly being interconnected to the initial guide box assembly having a barrier member positioned within it, as the former is being lowered into a trench formed in the ground adjacent to the initial guide box assembly; while

FIG. 5 is a plan, cross-sectional, detail view of the sealed, male/female interconnection joint used in a first exemplary embodiment of two adjacent, interconnected barrier members, which with a series of like barrier members is used to make up the containment wall of the invention.

FIG. 11 is a plan, cross-sectional, detail view of the sealed, male/female interconnection joint used in the preferred, alternative, barrier member embodiment of FIG. 10, showing in detail the sealed, male/female interconnection joint between two adjacent, interconnected barrier members, which with a series of like barrier members is used to make up the preferred containment wall of the invention.

FIG. 12 is a perspective, exploded, detail view of the spacer plate and guide shafts of the guide box assembly embodiment of FIG. 10, upon which spacer plate the bottom of its respective barrier member is supported in the ground, with the barrier member not shown for purposes of simplicity; while FIG. 13 is an end, detail view of the spacer plate of FIG. 12 buried in the ground.

MODES FOR CARRYING OUT THE INVENTION

Figure 1:
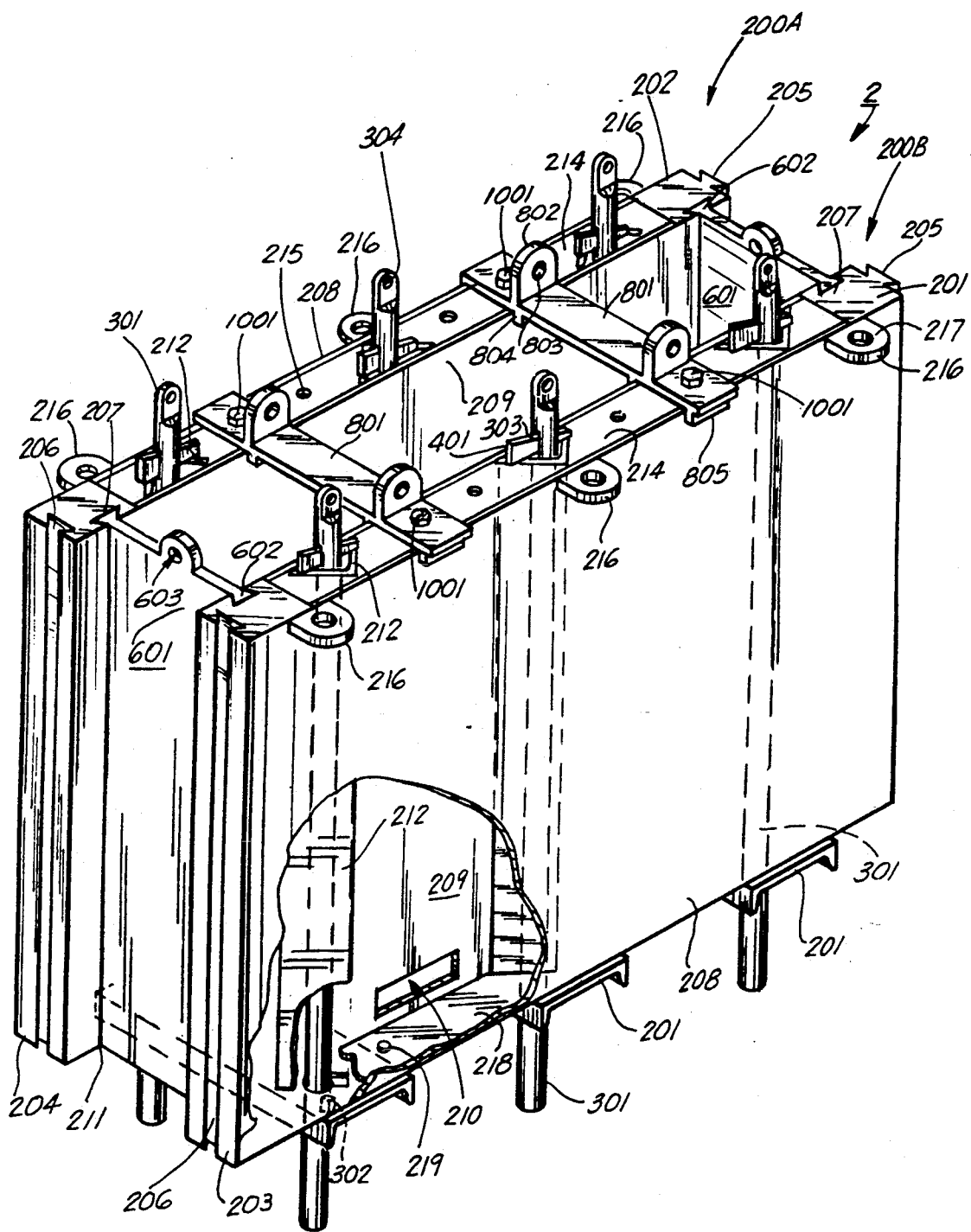
FIG. 1 is a perspective view, partially cut away, of a first, exemplary guide box assembly of the invention, with all of its parts fully assembled together but without any barrier member contained within it.

Structure of Initial Guide Box Assembly (FIGS. 1+)

As can best be seen in FIG. 1, the first, exemplary embodiment of the guide box assembly includes two, like, opposed, parallel, vertical wall panels 200A & 200B having a mortise and tenon connector 201 for the right-hand wall panel & another, like mortise and tenon connector 201 for the left-hand panel, and a double mortise connector 203 for the right-hand panel & a like double mortise connector 204 for the left-hand panel. To provide male/female, interconnecting joint elements, the wall panels have two, flanking connector tenons 205 at one end and two, flanking connector mortises 206 for mating with connector tenons (like 205) of another, adjacent panel at the other end, respectively.

Opposed, laterally directed, connector mortises 207 are provided on the interior ends of the wall panels 200 for mating with gate tenons 602 on laterally extending, end gates 601. The gates 601 in combination with the wall panels 200 define an enclosed, protected space into which appropriate barrier members can be placed, isolated and protected from any incursion of dirt or other debris from the surrounding ground.

Each gate 601 also includes a gate lifting-eye 603 to allow for its easy removal from the wall panels 200 when so desired. Thus, the two, laterally disposed, end gates 601 are slidingly engaged between the wall panels 200 at their longitudinally spaced ends, closing off their longitudinal spaced ends, with each gate having a width great enough to accommodate the lateral thickness of a barrier member.

If so desired, a series of oppositely opposed holes (not illustrated) can be provided in the sides of each gate 601 spaced along its vertical height at least in its upper portion. With the use of locking or stop pins, which are placed in selected ones of the opposed holes in the sides of the gate, the gate would be allowed to be only partially inserted into the wall panels 200 down a desired distance.

Each wall panel 200 includes an outer skin 208 forming an interior wall surface and a parallel, inner skin 209 forming an interior wall surface, which includes through it a series of hand access openings 210, allowing easy access to the inside of the panel for ease in, for example, bolting and unbolting various items which might be connected to the underside of the panel. A bottom gate stop 211 is provided on the bottoms of the wall panels 200 at least in the areas underlying the female mortises 206. When a series of vertically stacked and connected panels 200 are incorporated in a stacked configuration (not illustrated), the gate stop 211 is installed only on the lower most panels.

Figure 6:
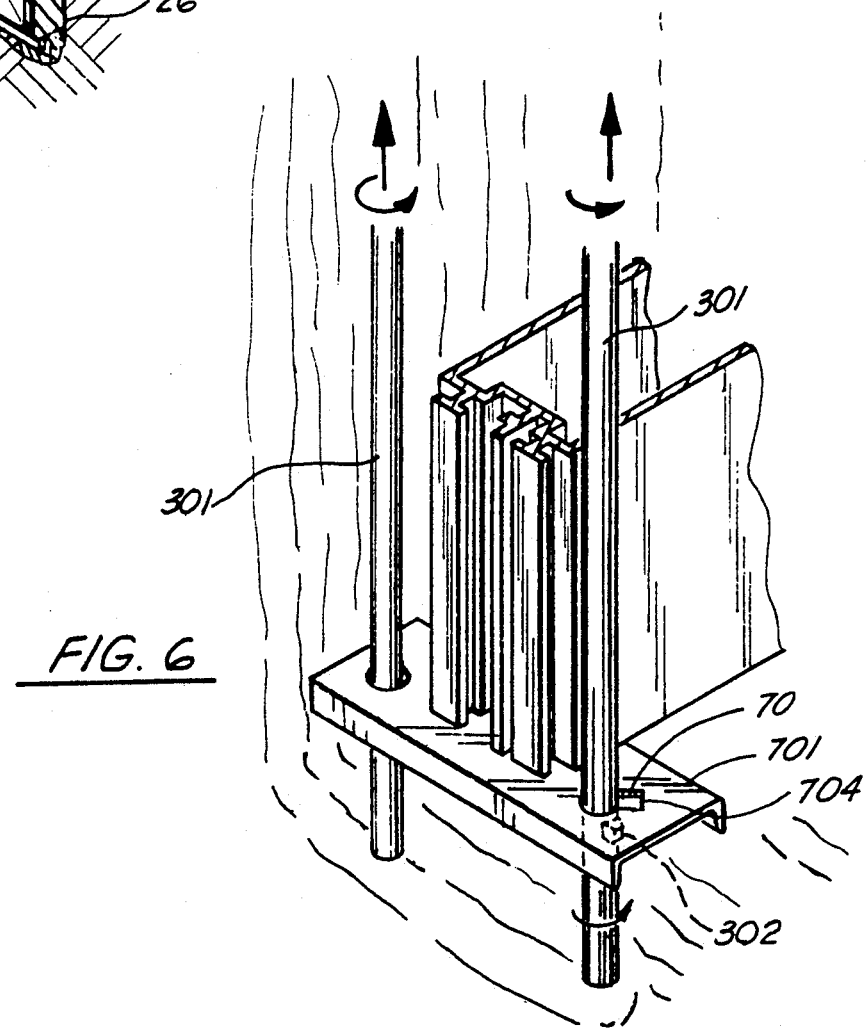
FIG. 6 is a perspective view, with the surrounding dirt and the adjacent barrier member cut away for purposes of illustration, showing the removal of the two, end guide shafts from the keyed holes of the spacer plate at one end of a guide box assembly, with the side walls of the assembly having already been removed, leaving the spacer plate under the barrier member in place in the ground.

A series of vertically extended, structural, angle irons 212 are included in each wall panel 200, each one serving as a vertically extended, structural member and as a guide slot for a vertically disposed guide shaft 301 having a guide shaft dog 302 at its bottom area (see also FIG. 6). Each angle iron element 212 provides a guide slot 213 for its respective guide shaft 301 and its guide-shaft-dog 302.

To complete the basic wall panel structure, an upper, longitudinally extended, stiffener/mounting plate 214 and a lower, longitudinally extended, stiffener/mounting plate 218, are provided affixed to the outer and inner skins 208, 209, respectively, with the stiffener plates being welded to the structural angle iron members 212 and with each plate having a series of mounting holes 215, 219, respectively, spaced along its respective, longitudinal length for use in, for example, bolting together a series of vertically stacked panels for a containment wall of a height greater than the height of a single wall panel 200. Thus, the guide box assemblies can be provided in a variety of standard heights, with greater heights being achieved by bolting together appropriate ones of two or more individual wall panels using the upper and lower bolt holes 215/219 to bolt an upper one to a lower one. Hence, for example, two sets of ten (10') foot height panels 200 could be bolted together to install a twenty (20') foot height containment wall.

The upper holes 215 (on the top two panels) are also used to affix by bolting sets of rigid, spacing and lifting bars 801, which are made of, for example, steel, and laterally extend across from one wall panel 200A to the other 200B. Each bolting unit 1001 typically would include a bolt, nut, and two washers.

At the top of each panel 200 are affixed aligning and plumbing clips 216 provided along the panel's length, each of which includes a hole 217 for easy attachment of a standard cable and ratchet assembly (not illustrated).

As can be seen in FIG. 1, a guide shaft 301 is positioned in each one of the guide slots 213 with its bottom end extending through and locked into a respective one of a series of laterally extending, rigid, anchoring, spacer plates 701 (note also FIG. 6) made of, for example, steel. As can be seen in FIG. 6, each spacer plate 701 includes two circular holes 703, each with a keyway, radical slot 704 in it, designed to allow the passage of the radial lug or dog 302 on a guide shaft 301 through it. Once the dog 302 has passed through the key-way slot 704 and the shaft 301 appropriately rotated, the bottom end of the shaft is locked into its respective anchoring spacer plate 701. By reversing this action, i.e., oppositely rotating it, the shaft can be unlocked from the spacer plate.

An upper slot 303 is provided in the top end of each guide shaft 301, into which a tapered, "draw-up" plate 401 is driven. This causes its respective guide shaft 301 to be drawn up in its respective slot 213 until the respective spreader plate 701 to which the shaft is locked bears up against the bottom stiffener plate 218. When this is done for all six shafts 301 and the upper spacers 801 are bolted in place, the two panels 200 are relatively tightly assembled together in a rigid assembly unit and moveable around as an integral unit under the lifting action and control of, for example, a crane. The guide box assemblies, when fully assembled, are free standing, rigid and self-supporting.

Each spacer and lifting bar 801 includes a lifting-pad 802 with a lifting-pad eye 803, to which a crane cable and cradle assembly 1002 (see FIG. 2) can be easily attached. Each spacer bar 801 also includes, on its bottom, opposed sets of inner spacing shoulders 804 and outer spacing shoulders 805 for fitting about and holding between them the wall panels 200.

If so desired, a series of (or one continuous) longitudinally and downwardly extended, lateral-shift-preventing plate(s) (not illustrated) could be bolted or otherwise attached to the bottom of the stiffener plate 218. Such a lateral-shift-preventing plate would then be tapped down into the ground when the guide box assembly is placed into a trench into the ground for stability and anchoring purposes.

Figure 2:
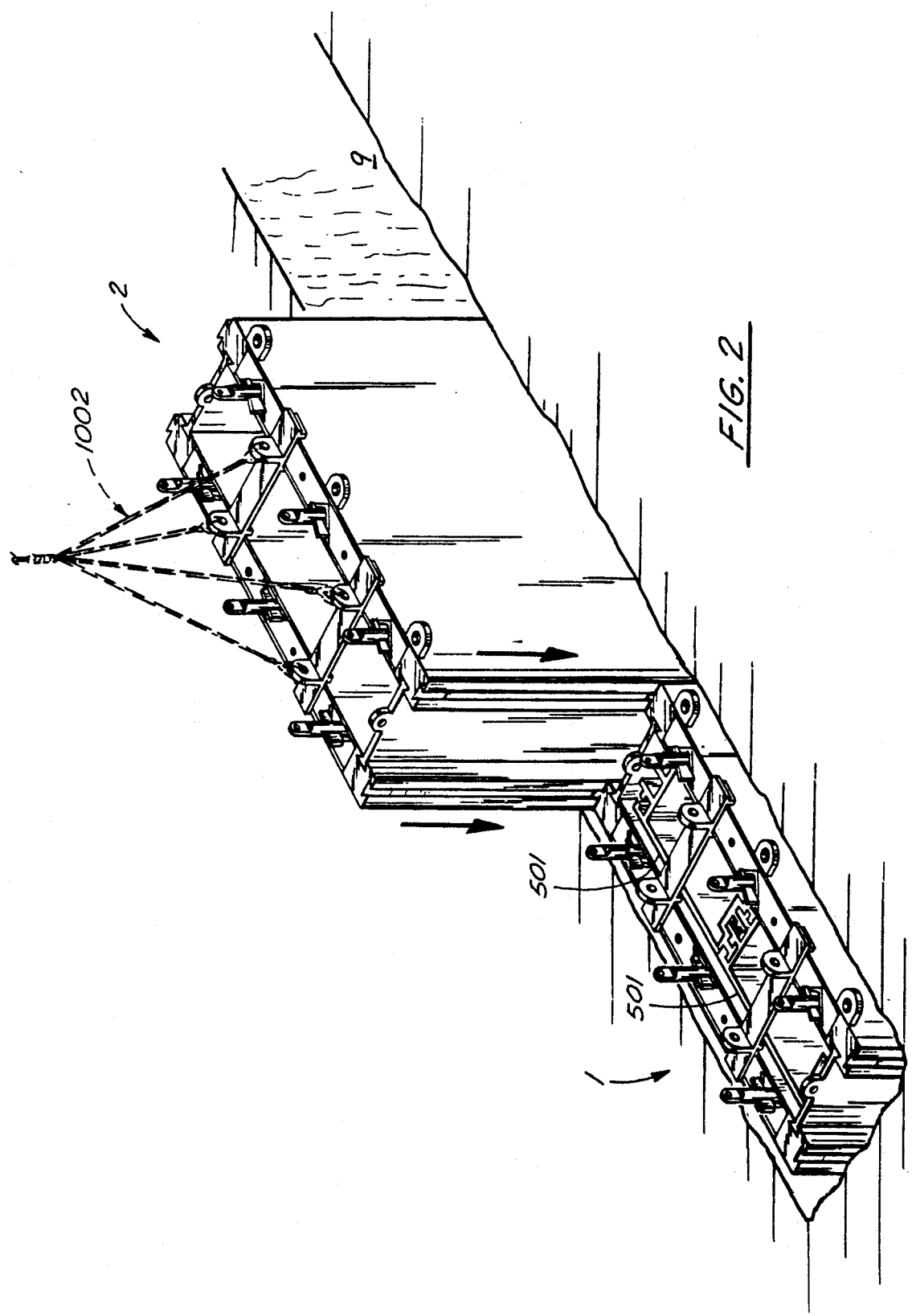

The foregoing described, initial embodiment of the guide box assembly of the present invention can be used to install, for example, a containment wall made up of the type of double wall barrier members 501, which can be seen in the initial guide box assembly unit (unit to the left in figure) shown in FIG. 2 and illustrated in some detail in FIG. 5. This double wall barrier member 501 is described in some greater detail in the concurrently filed application entitled "In-Ground Barrier Member Interlocking Joint and Seal System" of Breaux & Sansone (note particularly the embodiment of FIG. 10).

As can best be seen in FIG. 5 hereof, the barrier members 501, each of which includes a rectangular, double-wall, hollow, main body section 500, are interlocked together by means of a pair of longitudinally and laterally directed, interlocking members 502, 503 and 504, which form mating "T" members & cavities 502 & 502' and flank the sealed male/female coupling 509/510. These basic barrier wall elements 501 can be made of, for example, extruded thermoplastic made in the desired heights for the barrier members, e.g., ten (10'), fifteen (15') and twenty (20') foot heights.

As can be seen in FIG. 5, barrier members 501 employing the same design are included on the opposite sides interconnected together to form a complete barrier of the size and configuration desired. This design provides a joint having essentially the same strength as the body member 500.

In order to prevent passage of fluid through the joint, an elastomeric gasket 508, preferably of the type known as U-packing (shown in a close-up view in FIG. 11 of the Breaux/Sansone application in its "natural," uncompressed state), is placed in the side cavity formed between the longitudinally extended male member 509 and an opposed one of the longitudinally extended, flanking members 507, which extend parallel and along side the male member forming the female cavity 510. As noted above, the elastomeric material chosen for the gasket depends on the fluid being retained, with, for example, buna-n rubber being very suitable for water, but vinylidene fluoride hexaflouropropylene copolymer (e.g. "Viton" TM), for example, being preferred where corrosive chemicals are involved.

As can be seen in FIG. 5, the gasket 508 includes two seals formed back to back, sealing a gap between the male member 509 and an opposed one of said female cavity members or legs 507, so that pressure can be restrained in either direction. A groove, typically about thirty-seven hundredths (0.37") of an inch wide by twenty-five hundredths (0.25") of an inch deep, is provided in order to locate and hold the gasket 508 in place over the laterally directed member or boss 506, which interfaces with the gasket slot 580. The gasket 508 thus rides on the boss 506 and, through the boss, on the side of the male member 509.

Although the presence of the boss slot 580 makes the gasket have somewhat of a "U" shaped configuration with the lips then being described as extending out from the sides of the "U" shape, the gasket more accurately may be considered to have an extended, straight shape, with the lips extending directly out from the distal ends of the extended, straight shape.

In order to further prevent or at least retard any movement of the gasket 508 during installation, the gasket is secured in place by means of, for example, an adhesive. Installation of two adjacent, engaged barrier members 501 is accomplished by sliding the members together with their respective male/female members 509/510 and their respective side, flanking "T" members 502/502' mated and engaged.

Beveling the edges of the members 507 and applying, for example, a coating of vegetable soap or other suitable lubricant to the gasket 508 facilitates assembly.

Assembly is further facilitated by providing a sufficient gap or loose fit between members 502, 503 and 504 to minimize frictional forces. The gap should preferably be in the range of fifteen thousandths (0.015") to thirty thousandths (0.030") of an inch.

This gap allows one barrier member 501 to move in relation to the one to which it is coupled. This movement has no effect on the seal, as the gasket 508 moves inward or outward in the cavity formed between the male member 509 and its opposed member 507, and a tight seal is maintained regardless of its position in the cavity.

The initial seal of the gasket 508 is caused by compression of the gasket lips between the members 509 and 507. As pressure is applied to the internal U-shaped cavity, the seal becomes tighter.

In addition, when pressure is applied from side A, the pressure acting over the region C-D causes the nearest member 507 to deflect against the sealing gasket 508, causing a tighter seal. Similarly, when the pressure is applied from side B, pressure applied over the region E-F causes the centralized male member 509 to deflect against the gasket, also providing a tighter seal.

2nd Embodiment of Guide Box Assembly & Barrier Member (FIGS. 10-13)

An additional, currently more preferred, exemplary embodiment will now be described with reference to FIGS. 10-13, including second, exemplary embodiments of the guide box assembly and barrier member. However, for the sake of brevity, because many of the elements are the same or analogously the same (in which case analogous reference numbers were used), a description of all of them will not be provided to avoid redundancy.

Figure 10:
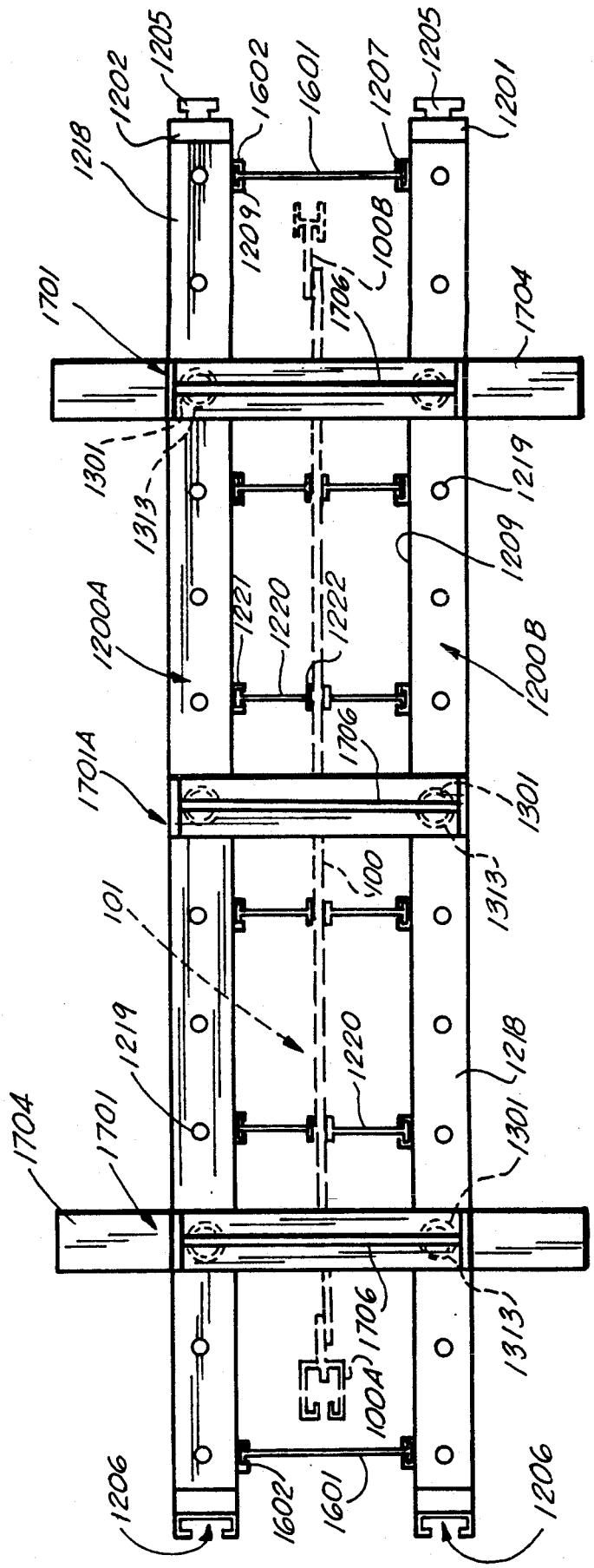
FIG. 10 is a bottom view of an alternate embodiment of the guide box assembly with an alternate embodiment of the barrier member of the present invention, both of which are the currently preferred embodiments in 1992.

As can be seen in FIGS. 10 and particularly 11, a second, currently more preferred embodiment 101 for the containment barrier member of the present invention includes a rectangular, single-wall, flat, main body sheet or section 100, which is assembled and joined together into a continuous, integrated in-ground, containment wall W with other like barrier members (see FIG. 8) by means of interlocking members 102 and 104.

The main body 100 includes two, connected coupling end pieces 100A & 100B affixedly connected at heat fused areas 100C. All three of these basic barrier wall elements can be made of, for example, extruded plastic made in the desired heights for the barrier members 101, e.g., ten (10'), fifteen (15') and twenty (20') foot heights. Exemplary plastic material for the barrier member 101 are medium (e.g. 0.934 g/cc density, ASTM) polyethylene or high density polyethylene (density great than 0.939 g/cc) polypropylene or possibly polyvinyl chloride (PVC) or other material inert to the materials to be confined by the barrier wall W or other thermoplastic material.

As can be seen in the assembly of FIG. 11, adjacent barrier members 101 employing essentially the same design (or an analogous design for a corner unit) are included on the opposite sides interconnected together to form a complete barrier of the size and configuration desired. This design preferably provides an interlocked joint (100A/100B, 102/104) having essentially the same as or greater strength than the main body member 100.

As can be seen in general in FIG. 10 and in more detail in FIG. 11, the coupling end element 100A has at its distal, coupling end a male coupling, including a centrally located, longitudinally extended male member 109 flanked by two, inwardly or laterally directed, "J" shaped members 102. The coupling end element 100B has at its distal, coupling end a female coupling, including a centrally located, longitudinally extended female chamber 110 formed by the interior of the sealing gasket 108 and two, longitudinally extended legs 107, which form part of the "H" shaped joint member 104.

When these two, male/female end pieces are mated and coupled together to opposite type end pieces on adjacent barrier wall sections 101, the "H" shaped piece 104 fits and nests within the opposed, "J" shaped members 102, with the tips of the "Js" curving around and holding in the lower legs of the "H". As can be seen in the assembled joint of FIG. 11, the combination provides in its coupling thickness five (5), parallel, flat, plate-like, relatively thin elements sandwiched together with the two (2), parallel legs of the "U" shaped gasket 108, described more fully below, namely the two (2), outside, side walls of the joint element 102, the two (2), enclosed legs of the "H" shaped joint element 104, and the centrally located, extended male member 109.

In order to prevent passage of fluid through the joint, an elastomeric gasket 108, preferably of the type known as U-packing (shown in a close-up view in FIG. 4 of the Breaux & Sansone application in its "natural," un-compressed state), is placed at the bottom of the female cavity 110 formed by the flanking longitudinally extended, side members 107. The elastomeric material chosen for the gasket depends on the fluid being retained, with, for example, buna-n rubber being very suitable for water, but vinylidene fluoride hexaflouropropylene copolymer (e.g. "Viton" TM), for example, being preferred where corrosive chemicals are involved. A further exemplary material is "Santoprene" TM.

The sealing gasket 108 includes two seals, i.e. double seals, formed back to back by two pairs of diverging, flexible lips 181/182 & 183/184, so that pressure can be restrained in either direction. These pairs of diverging lips are located at and divergingly extend out from the distal ends 186 of the "U" shape of the gasket 108, and, as can be generally seen in and generally understood from FIG. 11, form oppositely directed seals at two spaced areas between opposite sides 191 & 192 of the distal end of said male member and opposed ones of the interior walls of the flanking female cavity legs 107.

In order to prevent or at least retard any movement of the gasket 108 during installation of the barrier panels 101, the gasket is secured in place by means of, for example, an adhesive or by heat fusion when the gasket member is made from a thermoplastic elastomer which is compatible with the joint material. Installation is accomplished by sliding the adjacent, mating barrier members 101 together.

Applying a coating of vegetable soap or other appropriate lubricant to the gasket 108 facilitates assembly. Assembly is further facilitated by providing a sufficient gap between the joint interlocking members 102 and 104 to minimize frictional forces as the adjacent members are slid down with respect to one another. The gap should preferably be in the range of (0.015) to (0.030) inches.

This gap allows one barrier member 101 to move in relation to the one to which it is coupled. This movement has no effect on the seal, as the flexible gasket 108 moves inward or outward in the bottom area of the cavity formed by the longitudinally extended members 107, and a tight seal is maintained regardless of its position in the cavity.

The initial seal of the gasket is caused by compression of the gasket lips 181/182 & 183/184 between the distal sides 191 & 192 of the male member 109 and the bottom portions of the interior sides of the flanking members or legs 107. As pressure is applied to the internal U-shaped cavity, the seal becomes tighter.

With respect to the alternative, now currently preferred embodiment of the guide assembly box illustrated in FIGS. 10, 12 & 13, the two embodiments are very similar. The primary differences revolve around the use of:

circular, cylindrically extended, pipe slots 1213 provided by structural, vertically extended, pipe sections welded to the upper and lower stiffener plates, each having an inner diameter a little bit greater than the outer diameter of the guide shafts 1301 (vis-a-vis the triangular, angle iron slots 213 for the guide shafts 301);

"T" shaped male/female members 1205/1206 (vis-a-vis the mortise/tenon interconnections 205/206) for the male/female interconnecting joints between the guide assembly boxes;

"T" shaped male/female members 1207/1602 (vis-a-vis the mortise/tenon interconnections 207/602) for the joints between the gates 1601 and the ends of the wall panels 1200A & B; and threaded engagements (note FIG. 12) for the temporary connections between internally, female threaded, bottom ends 1302 of the guide shafts 1301 and threaded male bosses 1702 on the upper side of the base anchoring and bottom spreader plates 1701 (vis-a-vis the dog 302 and slotted, key-way opening 702/703);

Additionally, as can be seen in FIGS. 12 & 13, the base anchoring, centering and bottom spreader plates 1701 include laterally extended wings 1704 having vertically extending side plates 1705 at their distal ends which are provided to bear up against the side of a trench 9 (note FIG. 13), using said vertically extending distal end pieces to laterally stabilize the guide box assemblies against the side walls of the excavation. Also, a vertically and laterally extending anchoring plate 1706 is affixed to the bottom of each bottom spreader plate 1701 for anchoring the box assembly in the ground and preventing (or at least substantially retarding) any longitudinal movement of a guide box assembly once it has been interconnected to an adjacent barrier member and lowered into the ground (note FIGS. 2 & 3). As further shown in the bottom view of FIG. 10, the two, bottom, spreader, base plates 1701 toward the ends of the panels 1200 can include the centering, stabilizing wings 1704, while the center spreader plate 1701A can be of a simpler design.

Also, rather than use the tapered draw-up plates 401 to secure the upper ends of the steel guide shafts 301 to the upper stiffener plate 214, both ends of the steel shaft 1301 can include internal, female threaded ends 1302, allowing the use of a relatively simple bolt/plate securing arrangement (not seen in the drawings) to quickly and easily secure the upper ends of the shafts 1301 to their respective upper stiffener plate.

Such a rotatable arrangement allows for quick and easy attachment and detachment of the shafts to the upper ends of the wall panels, in similar fashion to the lower ends of the shafts and also to the quick and easy bolting and unbolting of the upper spreader bars (analogous to bars 801) using standard nut-bolt-washer arrangements 1001. As pointed out above, the lower and upper, laterally extending, spreader bars 701 & 801, respectively, are readily and easily attached and detached and removed from the wall panels 200 by means of, for example, threaded or rotatable attachments, with the upper using nut and bolt attachments and the lower using a slotted, key-way arrangement or a threaded Acme-type coupling (e.g., the threaded arrangement 1302/1702 between elements 1301/1701 of FIGS. 10-13).

Additionally, in order to give interim lateral support to the relatively thin, single wall structure of the barrier members 101, a series of laterally extending, insert beams 1220, each inserted at one end between two angle iron members forming a channel 1221 attached to the interior sides 1209 of the panels 1200, are included with the wall panels of the guide box assembly. The distal, "T" ends 1222 of the beams 1220 bear up against the sides of the main body 100 of the barrier member 101, providing it with lateral support (to minimize barrier wall deflection) until back-fill material is added into the interior of the guide box assembly.

Thereafter the insert beams 1220 can be removed, either separately or in combination with the main body panels of the guide box assembly, leaving the interconnected, single-wall barrier member(s) vertically in place, stabilized by back-fill. The lateral extent of the opposed insert beams, which of course determines the size of the gap (e.g. a one and half inch gap to laterally support the barrier body 100) formed between them, will depend upon the thickness of the barrier members to be installed within the guide box assembly(ies), and different sets of laterally supporting, insert beams having different widths can be used with the same basic guide box assemblies to accommodate different wall thicknesses of barrier members.

It is noted that the main wall section 100 of the barrier member 101 is not totally rigid and does have some flexibility and can partially deflect under its own weight due to its single wall construction and relatively thinness, and hence some interim lateral support is desirable. On the other hand, such single wall construction typically is not like the membrane or relatively very thin, sheet-type material of the prior art which can, for example, be inflated or provided in rolls and basically have no capability of standing up on their own.

Method of Installation (FIGS. 2+)

As can be seen in FIGS. 2+, the initial steps in an exemplary embodiment of the containment wall installation methodology of the present invention is illustrated, in which a series of like barrier members 501 of the type of FIG. 5 are ultimately interconnected and installed in the ground using guide box assemblies of the type of FIG. 1.

Initially a trench 9 or other appropriate excavation opening is dug. The excavation of a trench 9 for installation of a containment wall W (as taught in FIG. 1 of the '233 "grandparent" patent) without a guide box assembly may be satisfactory implemented in areas with highly cohesive soils, but typically will not be satisfactory where the soil has a very high moisture content, is sandy or otherwise likely to "cave". Thus, the guide box assembly method of installation of the invention typically will be used where soil caving is likely to be a problem. The guide box assembly method of the invention is critical in such situations, as the excavation may have to be as deep as, e.g., forty (40') feet, and the hole should be "clean" prior to the in-ground installation of the vertical barrier members 501 (101). Additionally, when a single-wall-type barrier member 101 is used, direct lateral support of the sides of the barrier member along its vertical extent is highly desirable, if not essential, in order to keep the relatively thin main wall body 100 of the barrier member from curving and becoming out-of-line and/or out-of-plumb.

Loose sand, gravel, or the like can interfere with the engagement of the barrier members 501 (101). Further, debris forming at the bottom of the hole during installation may tend to prevent communication of the barrier with the clay strata, thereby allowing migration of the contaminant between or below them. It is for these reasons that the guide box assembly method of installation of the invention was developed and is particularly suitable for such situations.

Figure 3:
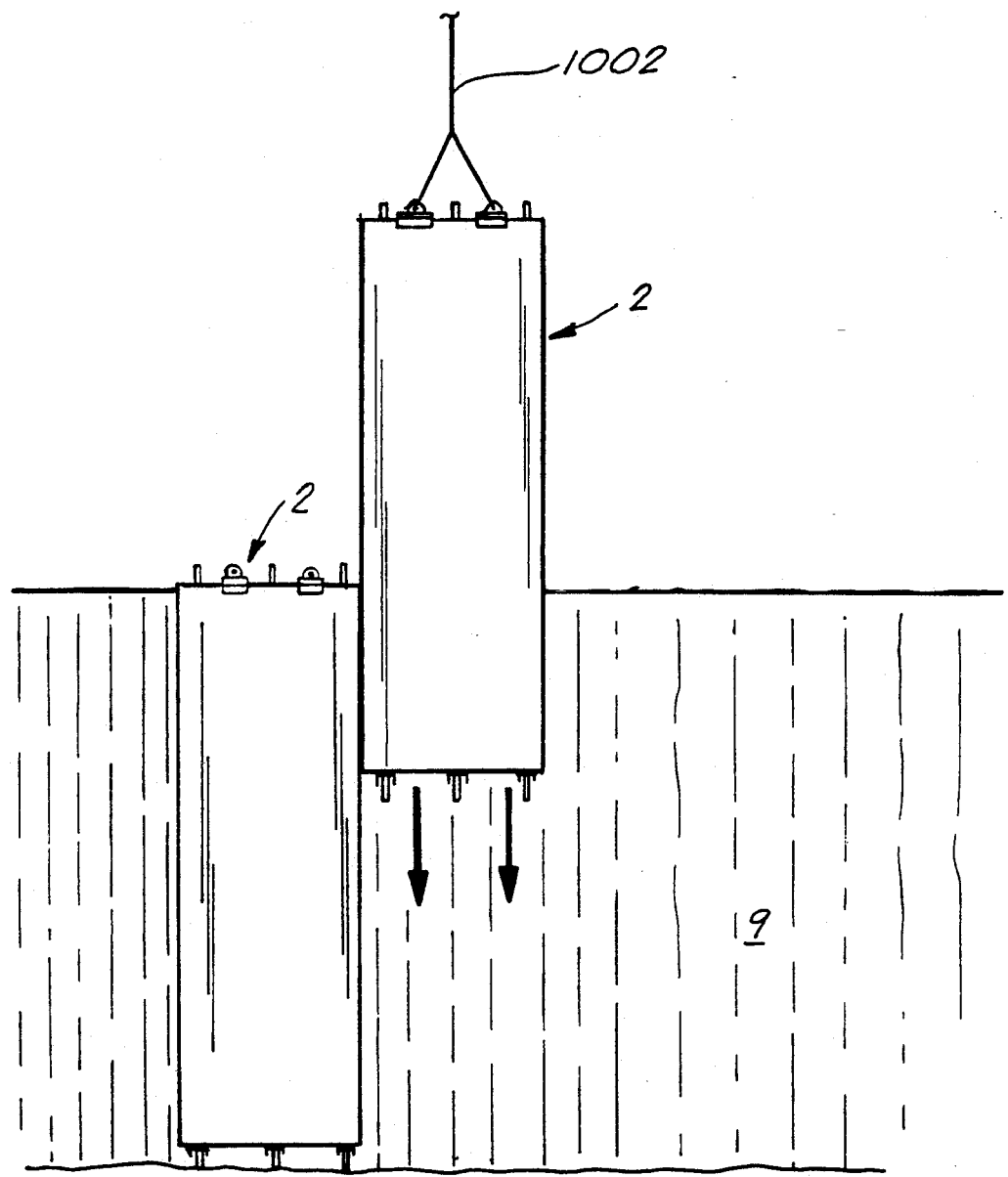
FIG. 3 is a side view of the step illustrated in FIG. 2.

As noted above, the methodology of installation of the invention is illustrated in FIGS. 2–7 and comprises the utilization of the "guide box" assembly or apparatus referred to supra in connection with the discussion of FIG. 1. As can be seen in FIGS. 2 & 3, initially a trench 9 is dug (using, for example, a backhoe type of implement), having an exemplary width of about forty-two (42") inches and a depth of about ten (10') feet, or of whatever depth is needed to reach, preferably, an underlying layer of fluid impermeable material (e.g. clay layer 20, see FIG. 9). Alternatively, the soil could be augured out, as detailed in the grandparent '233 patent.

A starting guide box assembly 1, completely assembled together as shown in FIG. 1, is positioned in the beginning of the trench 9, it being noted that both gates 601 are closed. The box assembly is generally centered (using, for example, the wing elements 1704/1705) and then more exactly centered and plumbed to exactly vertical and fixed in position at the top with temporary braces extending from the top areas of the wall panels 200 (1200) to the ground adjacent to the trench 9.

The exterior walls of the assembly are typically spaced from the side walls of the excavation, and the guide box assembly also is preferably tapped down into the underlying impermeable strata 20, using, for example, the underside of the bucket of the backhoe, causing the base spreader bars 701 (1701) to be driven down into the underlying strata, initially anchoring the base spreader bars and hence the connected main body of the box assembly in place (note FIG. 13). Some initial back-filling 26 can be added to the bottom of the trench 9 to laterally stabilize the bottom of the box guide(s) between the bottom areas of its exterior side walls 208 (1208) of the wall panels and the bottom areas of the side walls of the trench.

Then, a second, completely assembled, guide box assembly 2 is interconnected through the male/female interconnecting joint 205/206 to the initial or starting guide box assembly 1 and lowered down into the trench 9, with the joint elements interconnected and being slid down with respect to each other until their bottoms and tops are co-extensive, using a crane holding the second box assembly by means of a cable carriage 1002.

Then a third, fully assembled guide box assembly 3 is in like fashion interconnected to box assembly 2 and lowered down into the trench 9 until an interconnected series of box assemblies 1–3+, such as that generally shown in FIG. 3, is created. This process is sequentially repeated, using straight or corner boxes as needed, until ultimately the complete circuit needed for the containment wall W is completed.

As this process of sequentially adding in-line, box assemblies continues, barrier members 501 (101) are added into the interior spaces or longitudinal slots provided by the interconnected guide box assemblies 1+. If need be, one or more of the upper spreader bars 801 can be unbolted and removed (or moved to another location and re-bolted) to allow any needed access to the interiors of the boxes for insertion of the barrier members. Typically, the initial or starting box 1 will already include a barrier member, as illustrated in FIG. 2 (for simplicity of illustration it is not shown in FIG. 4). In the embodiment of FIGS. 10+ the insert beams 1220 provide lateral support to the main bodies 100 of the barrier members 101 along their full heights.

This barrier member insertion and assembly can commence once at least two or more box assemblies have been interconnected in the trench 9. Once the boxes 1+ have been interconnected, the interior gate(s) 601I, i.e. those gates not at the very ends (cf. 601E) of the line of box assemblies, can be lifted out, allowing the next barrier member 501 (101) to be interconnected to the preceding barrier member through their respective sealed, male/female joint elements.

Figure 4:
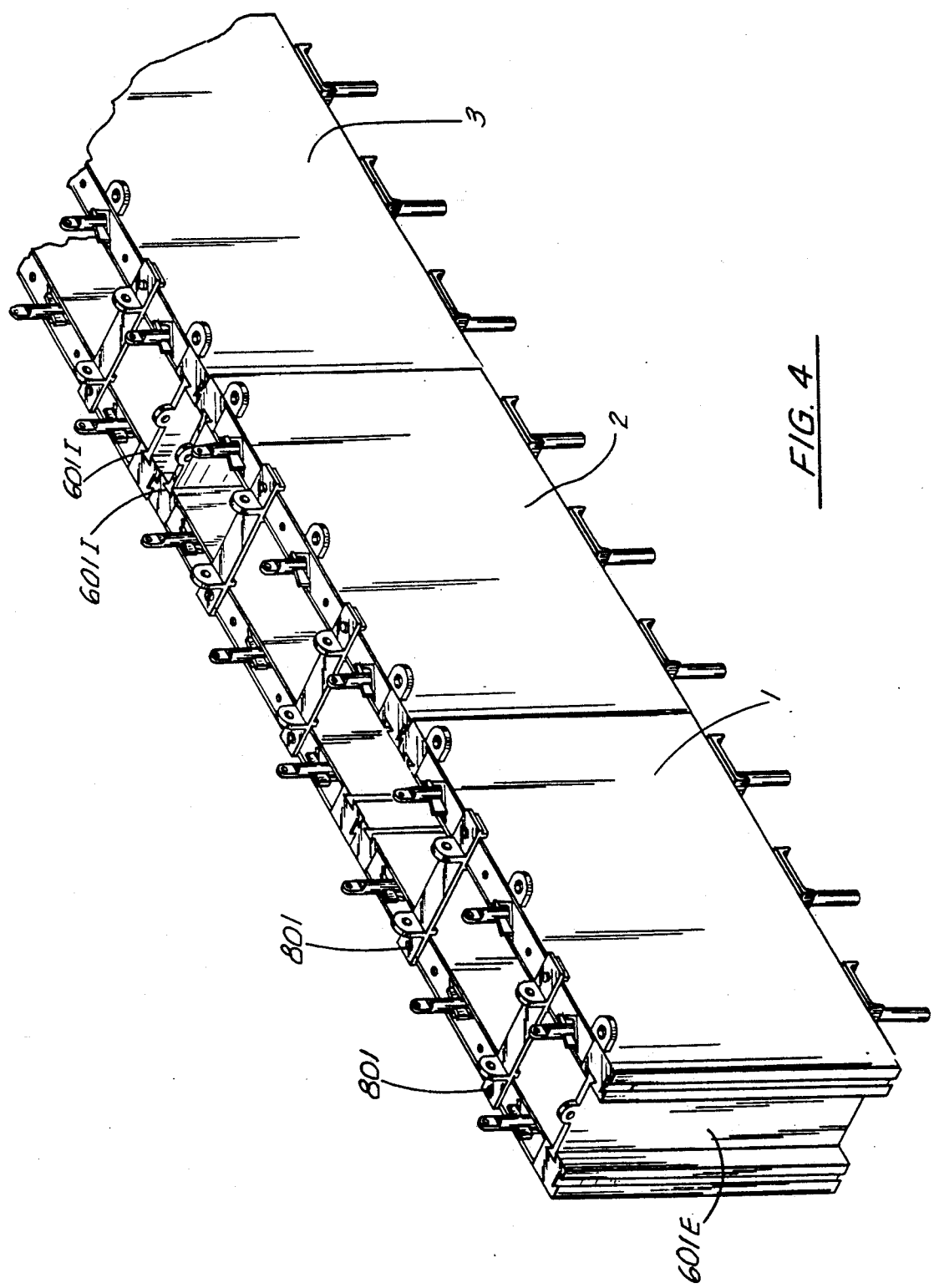
FIG. 4 is a perspective view of an exemplary series of three guide box assemblies (of the type shown in FIG. 1) fully interconnected together as they would exist in the ground, with the ground not being shown to better view the guide box assemblies and without any barrier members being placed in any of the guide box assemblies for purposes of simplicity.

Thus, in FIG. 4, it can be seen that the gates between box assemblies 1 & 2 have been removed. To remove a gate 601, a cable is merely connected to its eye 603, and the gate is then merely lifted up out of the assembly using, for example, a crane or cherry picker or the like.

The interconnected box assemblies 1+ thus provide a "clean," isolated, temporary, work space devoid of dirt or debris for inserting and interconnecting the barrier members 501 (101) completely isolated from the surrounding ground. In similar fashion to interconnecting and lowering the box assemblies, the male/female joint elements 509/510 & 502/502' (109/110 & 102/104) on the barrier members are initially aligned and then engaged as one member is lowered down with respect to the preceding member.

Figure 7:
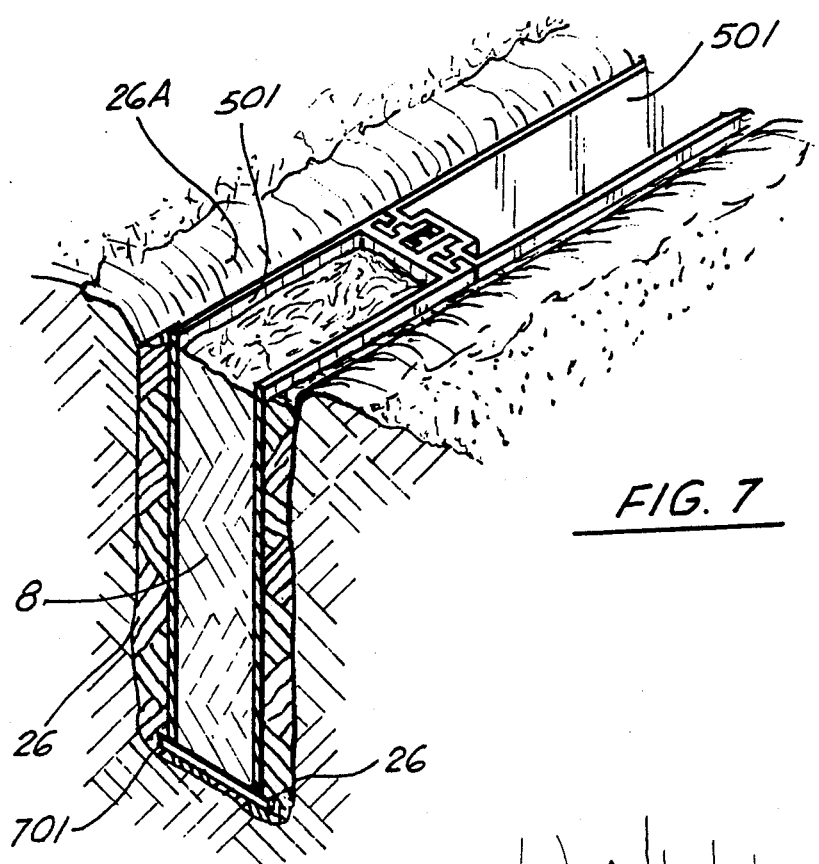
FIG. 7 is a perspective, cut-away view showing the interconnection between two, installed barrier members of the type of FIG. 5, with the closer one filled with material and with the side areas on the outside of the barrier members also filled with preferably the excavated material from the trench.
Figure 9:
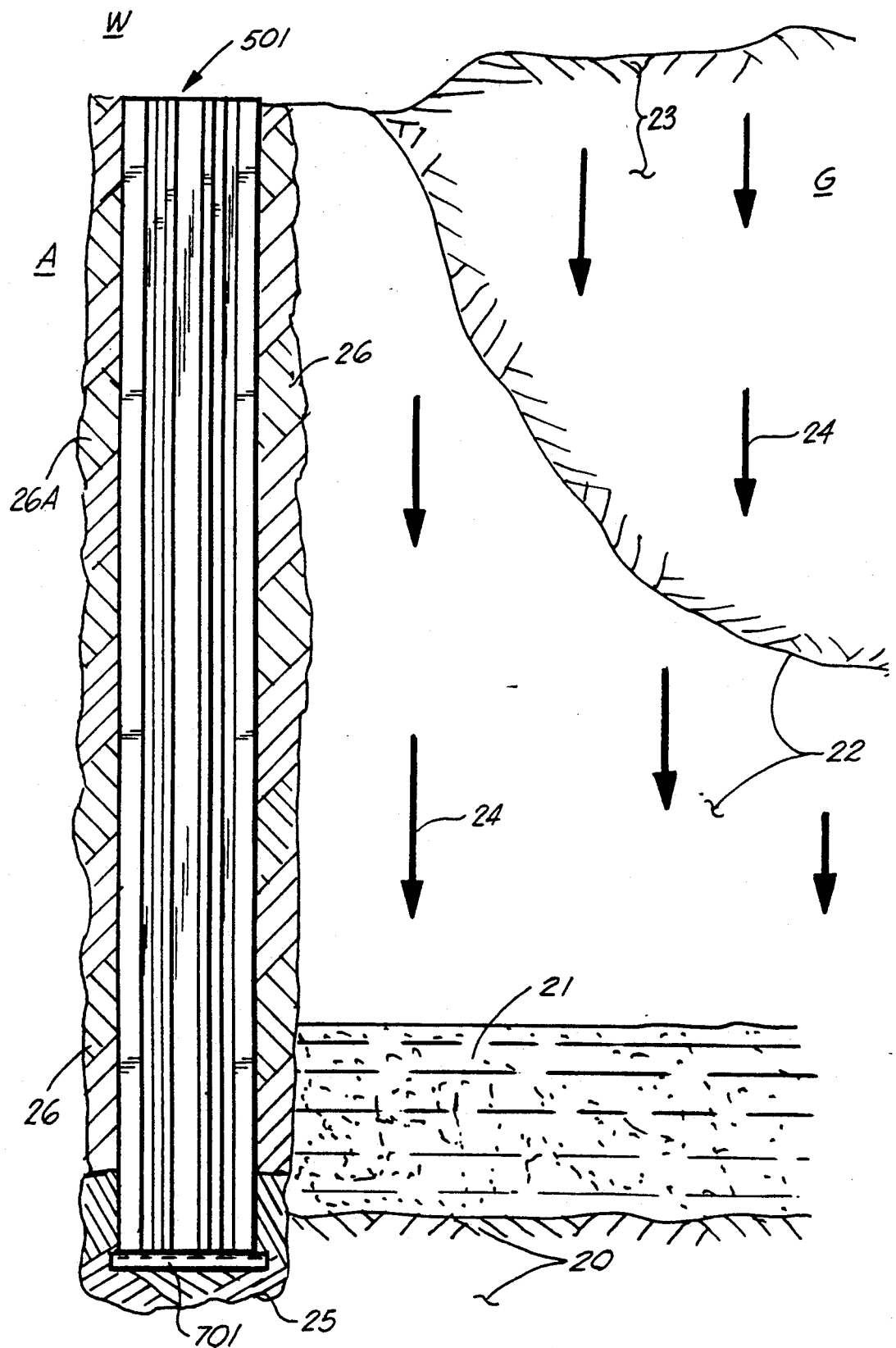
FIG. 9 is a partial, side, cross-sectional view of the initial, exemplary embodiment of the barrier member of the present invention, completely installed, illustrating the sealing characteristics of the fluid impermeable barrier relative to an exemplary migration of toxic fluid waste and further illustrating the use of a clay-like substance embedding and sealing the base of the barrier wall.

After the barrier members 501 (101) are slidingly engaged in place within the protected work space provided by the interconnected box assemblies 1+, the hollow cores or interiors 6 of the interconnected barrier members 501 are thereafter filled with sand' or other granular material or back-fill 8 (note FIGS. 7 & 9). Additionally, if so desired, a bottom sealing layer 25 of impermeable, sealing material, such as, for example, bentonite, is added to the bottom of the trench 9 before the back-fill 8 to a depth of, for example, twelve (12") or eighteen (18") inches or more, embedding the lower portion of the barrier members 501 (101), as well as further embedding the anchoring plates 701 (1701), into sealing engagement with the underlying impermeable strata 20.

Ultimately the rest (26A) of the excavation 9 surrounding the wall structure in the area(s) in which the barrier members 501 (101) have been installed is then filled, preferably with the material excavated to form the trench 9 or other selected material. This procedure can be done just after a series of boxes have been placed and set into the trench 9 but only partially back-filled (26) to prevent any movement of the bottoms of the boxes, which had provided sufficient stability to the boxes.

Likewise the areas between the interior walls 209 (1209) of the wall panels 200 (1200) and their respective barrier member(s) 501 (101) are filled with back-fill or other selected material. However, complete back-filling for an installed box and its contained barrier member(s) should not occur until at least the very next box assembly and its barrier member(s) have been put in place, and, if some back-filling has gotten over into an area in which a guide box assembly or barrier member(s) still need to be placed, some preliminary, trench bottom clean-out may be necessary.

It is noted that the barrier members 501 (101) are not necessarily completely covered over when the system is implemented, and it may be desirable to have the barrier wall W protrude up out of the ground so as to prevent water runoff from the surface to other areas, as the runoff may contain contaminants as well. The top of barrier members 501 may also be capped, if so desired, to prevent the filling of the cores 6 with water, as such could result in cracking or breakage of the structure if the contained liquid were to be frozen and thus expanded to form ice.

As the assembly of interconnected box assemblies 1+ and interconnected barrier members 501 (101) continues and the barrier members appropriately stabilized with fill, the previously used box assemblies can be removed and reassembled and re-used down the line. To do this, the tops of the guide shafts 301 (1301) are disconnected from the tops of the wall panels 200 (1200), and any remaining upper spreader bars 801 preferably are unbolted and removed. The wall panels are then pulled up with the use of a crane or picker [with the guide shafts 301 (1301) sliding through them] out of the trench 9 (now at least partially and preferably completely refilled), leaving the guide shafts still locked to the bottom spreader and anchoring plates 701 (1701). Once the wall panels 200 (1200) clear the top of the shafts 301 (1201), the main part of the guide box assembly separates into the two, separated and disconnected wall panels 200 (1200), with the bottom spreader bars 701 (1701) remaining down in the bottom of the filled trench and the upper spreader bars 801 having been preferably removed.

As a final step in the removal of a box assembly, the lower ends of the guide shafts 301 (1301) are unlocked or disengaged by appropriately rotating them, and they are then pulled up out of the at least partially filled and typically fully filled trench, leaving the interconnected barrier members 501 (101) in place resting on the bottom anchoring plates 701 (1701). The parts of each guide box assembly are then reassembled, using new anchoring, spreader plates 701 (1701), and re-used down the line as further needed to form the complete containment wall W.

Figure 8:
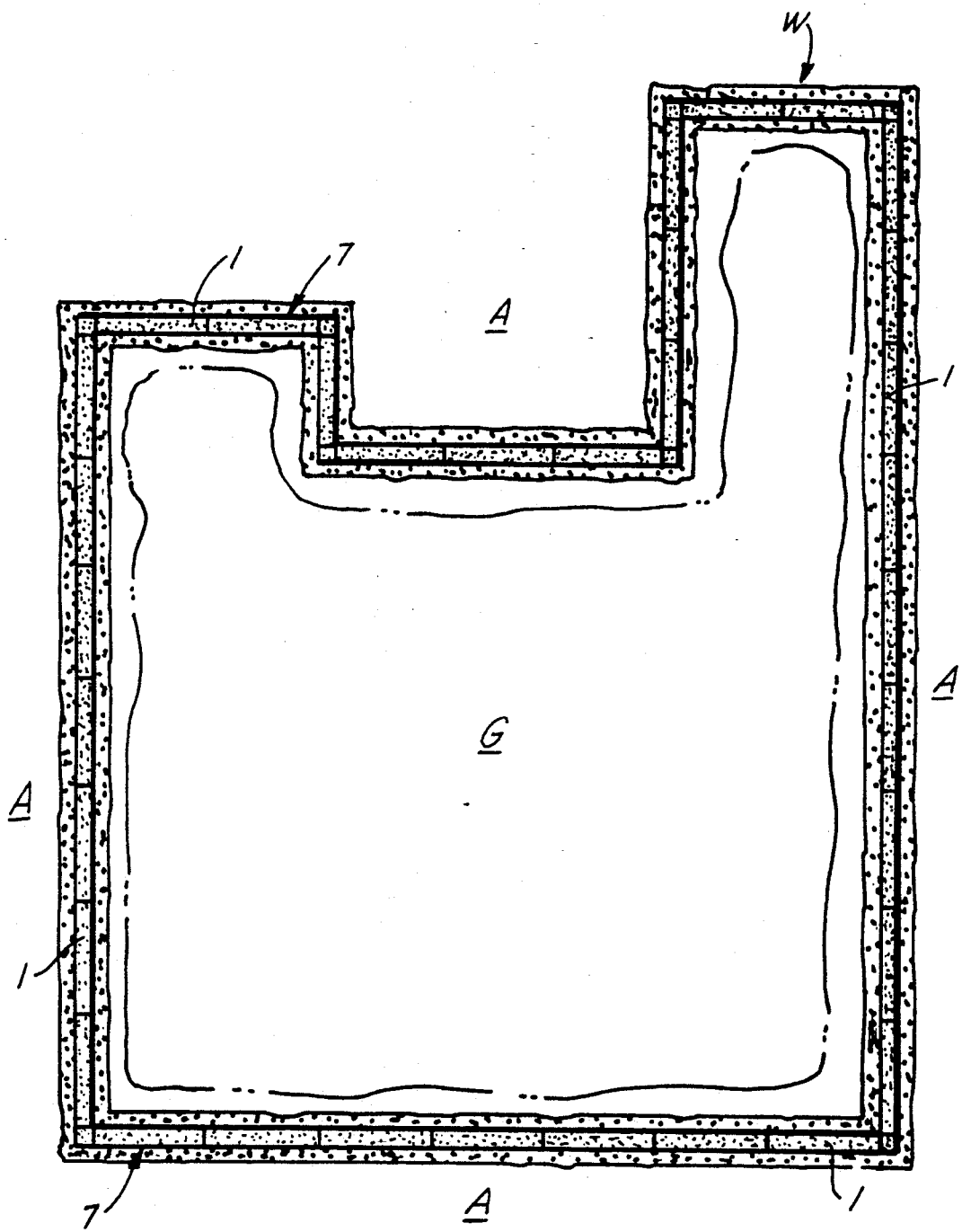
FIG. 8 is a plan, generalized or simplified view of an exemplary, completed, in-ground barrier containment wall system, comprised of a series of vertically disposed or arrayed, edge-to-edge interconnected barrier members of a suitable type with which the present invention can be used.

Thus, after the installation of the various barrier members 101 (501) is completed, as can be seen in the simplified, generalized FIG. 8, the exemplary embodiment of the general containment system W is formed. Thus, as should now be understood, the containment wall W includes a series of interconnected, adjacent, associated barrier members 1 slidingly engaged to form a subterranean, vertical, sealed barrier wall W. The barrier wall W stands on and penetrates an underlying, impermeably strata (e.g. clay), the two in combination isolating the ground and its contents G, which can include, for example, toxic wastes, from the surrounding area A. The vertical height of the containment wall W may be of the order of five to forty (5-40') feet or more, depending on the depth of the underlying impermeable layer.

For a further understanding of these types of barrier containment systems and additional ways of how they can be installed down in the ground and what are some other exemplary types of male/female joints for the barrier members that might be used, reference is had to the grandparent '233 patent and the concurrently filed Breaux/Sansone application.

However, as discussed above, it should be understood that one barrier member 1 is preferably slid down into interconnection with the other, adjacent, preceding one, using the male/female joint and associated seals described more fully above, as part of their in-ground installation. Guide box assemblies, such as the ones described above, which temporarily isolate the barrier members 1 from the surrounding ground G/A, preferably are used to guide and hold the various, constituent, barrier members 1 as they are interconnected together to ultimately form the completed containment wall W, as all described above. If needed, lubricants can be used to assist in sliding the joint coupling and gasket elements of the barrier members 1+ with respect to one another.

FIG. 9 is a side view of the vertical barrier member 501 forming part of the wall W in its implemented state, illustrating a cross-sectional view of the containment area, showing via arrows 24 an exemplary migration of contaminants.

As shown in the figure, the containment wall W is implemented vertically in a mostly subterranean manner to a sufficient depth to communicate with the fluid impermeable strata 20 such as clay or the like. The fluid impermeable vertical barrier wall system, communicating with the clay strata, forms a relatively impregnable "container."

In the present example, toxic waste material 23 in a dump or the like contains contaminated fluids 24 or suspended material which may migrate through the natural soil 22 to the ground water aquifer 21 which, without containment, would increase its rate of migration out of the area, contaminating, for example, lakes, rivers, and the water supply. It should be noted that neither the aquifer 21 nor the contaminant 24 permeates the clay strata 20. Thus, the use of the present invention prevents migration of the contaminants 24 in the site, and cuts off flow of the natural aquifer 21 in the containment area.

The vertical barrier wall W, with its over-all impermeably sealed barrier 7, prevents migration of the contaminant and any tainted water in the containment site. As noted above, in order to prevent leeching of the contaminant between the bottom of the barrier and the clay strata 20, a layer of bentonite 25 or the like may be deposited at the base of the trench prior to installation of the barrier system. Also, as noted above, to further prevent leaching under the barrier wall, the guide boxes for the barrier members preferably are "tapped" into the clay strata 20 a short distance to further seal the system into the underlying strata.

Although the preferred application for the present invention is the containment of fluid wastes overlying a fluid impermeable strata, the invention can also be applied to other fields or applications such as, for example, soil containment for levees, containment of solid wastes, etc.

It is noted that the embodiments described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

We claim:

1. A method of producing an in-ground lateral containment barrier system, preventing the lateral migration of fluid contaminants in an area in the ground, comprising the following steps:
   a. making an excavation around the area to be contained;
   b. forming a fluid impermeable barrier wall in the ground around the contaminants by placing a series of elongated barrier members within the excavation and slidingly engaging and interconnecting them in a vertical manner, connecting them together, including the sub-steps of:
      i. placing a first guide box assembly, having at least one longitudinal slot formed therein of a width to accommodate a barrier member, in the excavation,
      ii. placing a subsequent series of guide box assemblies in the excavation adjacent to a preceding one of said guide box assemblies, each guide box assembly having at least one longitudinal slot formed therein of a width to accommodate a barrier member, said guide box assemblies being placed in the excavation with the exterior side walls of the guide box assemblies being spaced from the side walls of the excavation, the interiors of said series of guide box assemblies forming a continuous, open area communicating with said slot of said first guide box assembly, providing a temporary, open, protected work space for the insertion and assembly of the barrier members in the longitudinal slots of respective ones of said guide box assemblies,
      iii. inserting a first barrier member in the longitudinal slot of said first guide box assembly, and
      iv. slidingly engaging and connecting together, in longitudinal fashion, a further series of barrier members to said first barrier member in the temporary, open, protected work space formed by said guide box assemblies, forming a fluid impermeable barrier in the ground; and
   c. filling the excavation with material, laterally containing the contaminated area with the fluid impermeable barrier members and ultimately removing at least the main structure of said guide box assemblies from said excavation.

2. The method of claim 1, wherein there is further included the steps of:
   repeating sub-steps "b-ii" and "b-iv" until the barrier wall has been completed and the fluid contaminants have been encircled.

3. The method of claim 1, wherein the contaminated area is located over a fluid impermeable strata, and wherein step "a" further includes the step of:
   making the excavation down to a sufficient depth to communicate with and expose the fluid impermeable strata; and
   and wherein step "b" further includes the step of:
   depositing a fluid impermeable medium at the base of the barrier wall prior to filling the excavation in step "c", assisting in the sealing of the barrier wall to the underlying impermeable strata.

4. The method of claim 3, wherein there is further included the step of:
   using bentonite clay for the fluid impermeable medium.

5. The method of claim 1, wherein step "a" further includes the step of:
   forming the excavation in stages by means of forming a continuous trench.

6. The method of claim 1, wherein at least some of said guide box assemblies includes two, spaced wall panels, each having an interior wall defining between them said work space and each having an exterior wall; and wherein there is further included in step "b" the steps of:
   placing said guide box assemblies in the excavation with space between the exterior walls of said wall panels and the sides of said excavation; and
   back-filling the bottom portions of the space between said exterior walls and the sides of said excavation.

7. The method of claim 1, wherein at least some of said guide box assemblies includes two, spaced wall panels, each having an interior wall defining between them said work space and each having an exterior wall and a series of wing members extending out from its respective wall past its respective exterior wall, said wing members having vertically extending distal end pieces; and wherein there is further included in step "b" the steps of:

placing said guide box assemblies in the excavation with space between the exterior walls of said wall panels and the sides of said excavation; and using said vertically extending distal end pieces to laterally stabilize the guide box assemblies against the side walls of the excavation.

8. The method of claim 7, wherein in step "b" there is further included the step of:

back-filling at least the bottom portions of the space between said exterior walls and the sides of said excavation.

9. The method of claim 1, wherein in step "b" there is further included the step of:

back-filling at least the bottom portions of the work space between said interior walls and the sides of the barrier members laterally stabilizing the barrier members.

10. The method of claim 1, wherein at least some of said guide box assemblies includes two, spaced, rigid, wall panels, each having an interior wall defining between them said work space, and each having an exterior wall, with said wall panels being temporarily held together as a rigid, assembled, unit by means of laterally extending, rigid, top spacer bars attached to the top portions of the wall panels and laterally extending, rigid, bottom spacer bars attached to the bottom portions of the wall panels; and wherein there is further included in step "b" the steps of:

placing said assembled, guide box assembly units in the excavation with their respective barrier member(s) on top of said bottom spacer bars and with the bottom spacer bars driven down into the bottom of the excavation until they are at least partially covered; and wherein there is also included the steps of:

thereafter detaching said bottom spacer bars from said wall panels and, after step "c," removing said wall panels from the filled excavation, leaving said bottom spacer bars down in the ground underneath the barrier members.

11. The method of claim 10, wherein there is further included the steps of:

also detaching the upper spreader bars from the wall panels and thereafter removing the wall panels from the excavation.

12. The method of claim 1, wherein at least some of said guide box assemblies includes two, spaced, rigid, wall panels, each having an interior wall defining between them said work space, and each having an exterior wall, with said wall panels being temporarily held together as a rigid, assembled, unit by means of laterally extending, rigid, top spacer bars attached to the top portions of the wall panels and laterally extending, rigid, bottom spacer bars attached to the bottom portions of the wall panels; and wherein there is further included in step "b" the steps of:

placing said assembled, guide box assembly units in the excavation with their respective top spacer bars attached and thereafter detaching at least some of them to provide better access to the interior of said units for placing the barrier members into them on top of said bottom spacer bars.

13. The method of claim 1, wherein at least some of said guide box assemblies include two, spaced, rigid, wall panels, each having an interior wall defining between them said work space, and each having an exterior wall, with said wall panels being temporarily held together as a rigid, assembled unit by means of laterally extending, rigid, top, spacer bars attached to the top portions of the wall panels and laterally extending, rigid, bottom, spacer bars attached to the bottom portions of the wall panels by means of a series of spaced, guide shafts extending down completely through said wall panels from their tops to their bottoms and rotatably engaged with said bottom spacer bars; and wherein there is further included in step "b" the steps of:

detaching said bottom spacer bars from said wall panels by rotating said guide shafts at their tops, and, after step "c," removing said wall panels from the filled excavation, leaving said bottom spacer bars down in the ground.

14. The method of claim 13, wherein there is further included the steps of:

detaching said top spacer bars before removing said wall panels from the excavation, causing the wall panels to then be un-connected when they are removed.

15. The method of claim 1, wherein at least some of said guide box assemblies each include two, laterally disposed, end gates slidingly engaged between the wall panels at their longitudinally spaced ends, each having a width great enough to accommodate the lateral thickness of a barrier member; and wherein there is further included the steps of:

removing the end gates at the opposed, interconnected ends between two, juxtaposed, interconnected guide box assemblies, providing an open, interconnecting area between their respective work spaces, and inserting a barrier member into said interconnecting area and interconnecting it to a preceding barrier member across the junction between said two, juxtaposed, interconnected guide box assemblies.

16. The method of claim 15, wherein there is further included the step of:

removing at least one upper spacer bar and moving it to another location along the length of said panels and reattaching it there, increasing the length of the space available at the top of the panels for inserting a barrier member.

17. The method of claim 1, wherein the box assemblies each have a width less than the width of the area of the excavation in which it is placed; and wherein there is included the further step of:

placing the box assemblies in the center areas of the excavation, leaving a gap between the side walls of said guide assemblies and the side walls of the excavation.

18. A guide box assembly system defining a temporary, protected, open, work space for installing and interconnecting, in-ground barrier members in an excavation, comprising:

two, spaced, rigid, connected, wall panels, each having a top and bottom and each having an interior wall defining between them the protected, open, work space of a size to accommodate a barrier member, and each having an exterior wall, said wall panels being temporarily held together as a rigid, assembled unit by means of laterally extending, rigid, spaced, top, spacer bars easily attached and detached across to the top portions of the wall panels and at least two, laterally extending, rigid, spaced, bottom, spacer bars easily attached and detached across to the bottom portions of the wall panels by means of a series of at least four, spaced, guide shafts extending down completely through the height of their respective wall panel from its top to its bottom, two per panel, and rotatably engaged with said bottom spacer bars at laterally spaced, end portions thereof, said bottom spacer bars being otherwise unattached to said wall panels, allowing said bottom spacer bars to be easily detached from the panels and left down in the ground in the bottom of the excavation by oppositely rotating said guide shafts at the tops of said panels.

19. The guide box assembly system of claim 18, wherein said bottom spacer bars further include at their bottoms:
   downwardly and laterally extending anchor plates drivable into the ground to longitudinally anchor said wall panels to the bottom of the excavation.

20. The guide box assembly system of claim 18, wherein said bottom spacer bars further include at their sides:
   wing members extending out laterally past said wall panels, said wing members having vertically extending, distal end pieces, which can laterally stabilize the connected wall panels against the side walls of the excavation.

21. The guide box assembly system of claim 18, wherein said wall panels each further include at its top and bottom:
   longitudinally extending, stiffener bars, each having a series of bolt holes through them spaced along their respective lengths, allowing one panel to be placed on top of another, vertically aligned, and be bolted together providing a combined wall panel having a combined height greater than either panel alone.

22. The guide box assembly system of claim 18, wherein said wall panels have between them:
   two, laterally disposed, end gates slidingly engaged between said wall panels at their longitudinally spaced ends, closing off their longitudinal ends, each gate having a width great enough to accommodate the lateral thickness of a barrier member.

23. The guide box assembly system of claim 18, wherein said wall panels include at their longitudinally spaced ends:
   longitudinally directed, flanking, male joint members and at their opposite ends longitudinally directed, flanking, female joint members having a configuration matingly compatible with said male joint members, allowing one guide box assembly to be interconnected to a like, juxtaposed, in-line guide box assembly through their opposed male/female joint members being slidingly engaged.

* * * * *